(12) United States Patent
Bullerjahn et al.

(10) Patent No.: US 9,073,784 B2
(45) Date of Patent: *Jul. 7, 2015

(54) CALCIUM SULFOALUMINATE CEMENT WITH TERNESITE

(75) Inventors: Frank Bullerjahn, Leimen (DE); Dirk Schmitt, Leimen (DE); Mohsen Ben Haha, Heidelberg (DE); Barbara Batog, Jablonka (PL); Maciej Zajac, Heidelberg (DE)

(73) Assignee: HEIDELBERGCEMENT AG, Heidelberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/239,339

(22) PCT Filed: Jul. 16, 2012

(86) PCT No.: PCT/EP2012/002975
§ 371 (c)(1),
(2), (4) Date: Apr. 29, 2014

(87) PCT Pub. No.: WO2013/023728
PCT Pub. Date: Feb. 21, 2013

(65) Prior Publication Data
US 2014/0230697 A1 Aug. 21, 2014

(30) Foreign Application Priority Data

Aug. 18, 2011 (EP) .................................. 11006757
Oct. 26, 2011 (EP) .................................. 11008570
Mar. 5, 2012 (EP) .................................. 12001488
Mar. 26, 2012 (EP) .................................. 12002111
Mar. 30, 2012 (EP) .................................. 12002342
May 10, 2012 (EP) .................................. 12003718

(51) Int. Cl.
| | | |
|---|---|---|
| C04B 7/345 | (2006.01) | |
| C04B 7/32 | (2006.01) | |
| C04B 28/06 | (2006.01) | |
| C04B 28/04 | (2006.01) | |
| C04B 28/08 | (2006.01) | |
| C04B 40/00 | (2006.01) | |
| C04B 28/02 | (2006.01) | |
| C04B 22/00 | (2006.01) | |
| C04B 22/14 | (2006.01) | |
| C04B 7/02 | (2006.01) | |
| C04B 7/26 | (2006.01) | |
| C04B 7/28 | (2006.01) | |
| C04B 16/04 | (2006.01) | |
| C04B 103/14 | (2006.01) | |
| C04B 111/00 | (2006.01) | |

(52) U.S. Cl.
CPC .............. *C04B 7/3453* (2013.01); *C04B 28/04* (2013.01); *C04B 28/065* (2013.01); *C04B 28/08* (2013.01); *C04B 7/323* (2013.01); *C04B 7/326* (2013.01); *C04B 7/345* (2013.01); *C04B 40/0039* (2013.01); *C04B 2103/14* (2013.01); *C04B 2111/00017* (2013.01); *C04B 2111/00767* (2013.01); *C04B 28/02* (2013.01); *C04B 22/0093* (2013.01); *C04B 22/14* (2013.01); *C04B 7/02* (2013.01); *C04B 7/26* (2013.01); *C04B 7/28* (2013.01); *C04B 16/04* (2013.01); *C04B 28/021* (2013.01)

(58) Field of Classification Search
CPC .......... C04B 7/32; C04B 7/323; C04B 7/326; C04B 7/345; C04B 28/04; C04B 28/065; C04B 28/08; C04B 40/0039
USPC .................................. 106/638, 692, 693, 695
See application file for complete search history.

(56) References Cited

U.S. PATENT DOCUMENTS

| | | | |
|---|---|---|---|
| 6,113,684 A * | 9/2000 | Kunbargi | ...................... 106/692 |
| 6,406,534 B1 | 6/2002 | Kunbargi | |
| 6,758,896 B2 | 7/2004 | Kunbargi | |
| 7,150,786 B2 | 12/2006 | Kunbargi | |
| 8,153,552 B2 | 4/2012 | Cau Dit Coumes et al. | |
| 8,557,039 B2 | 10/2013 | Jacob et al. | |
| 8,574,359 B2 | 11/2013 | Marchi et al. | |
| 2002/0164485 A1 | 11/2002 | Martin | |

(Continued)

FOREIGN PATENT DOCUMENTS

| | | |
|---|---|---|
| AT | 393 381 B | 10/1991 |
| CN | 1479700 A | 3/2004 |

(Continued)

OTHER PUBLICATIONS

Belz et al., "Use of Fly Ash, Blast Furnace Slag, and Chemical Gysum for the Synthesis of Calcium Sulfoaluminate-Based Cements", Fly Ash, Silica Fume, Slag and Natural Pozzolans in Concrete. Proceedings International Conference, vol. 1, No. SP-153 (1995), pp. 513-530, XP001011491.

(Continued)

*Primary Examiner* — Anthony J Green
(74) *Attorney, Agent, or Firm* — Paul D. Strain, Esq.; Strain & Strain PLLC

(57) ABSTRACT

The present invention relates to a ternesite calcium sulfoaluminate clinker as well as a ternesite clinker containing 20 to 100% by weight of $C_5S_2\$$ and less than 15% by weight of $C_4A_3\$$, as well as the use of ternesite as an additive to calcium sulfoaluminate (ferrite) (belite) (CSA(F)(B)) clinker, calcium sulfoaluminate (ferrite) (belite) cement, and calcium sulfoaluminate (ferrite) (belite) binder containing 10 to 90% by weight of CSA(F)(B) and 90 to 10% by weight of ternesite.

47 Claims, 20 Drawing Sheets

(56) References Cited

U.S. PATENT DOCUMENTS

| | | |
|---|---|---|
| 2004/0101672 A1 | 5/2004 | Anton et al. |
| 2011/0308431 A1 | 12/2011 | Pasquier et al. |
| 2012/0085265 A1 | 4/2012 | Walenta et al. |
| 2013/0118384 A1 | 5/2013 | Barnes-Davin et al. |
| 2014/0230696 A1 | 8/2014 | Bullerjahn et al. |
| 2014/0230699 A1 | 8/2014 | Bullerjahn et al. |
| 2014/0238274 A1 | 8/2014 | Bullerjahn et al. |
| 2014/0261088 A1 | 9/2014 | Bullerjhan et al. |
| 2014/0283712 A1 | 9/2014 | Bullerjahn et al. |

FOREIGN PATENT DOCUMENTS

| | | |
|---|---|---|
| CN | 101952216 A | 1/2011 |
| DE | 21 22 710 A1 | 11/1971 |
| DE | 37 01 717 C1 | 4/1988 |
| DE | 196 44 654 A1 | 4/1998 |
| DE | 198 43 092 A1 | 11/1999 |
| DE | 600 29 770 T2 | 8/2007 |
| DE | 10 2005 054 190 B3 | 10/2007 |
| EP | 0 397 963 A1 | 11/1990 |
| EP | 0 838 443 A1 | 4/1998 |
| EP | 0 858 981 A1 | 8/1998 |
| EP | 0 959 053 A1 | 11/1999 |
| EP | 1 171 398 B1 | 8/2006 |
| EP | 2 159 202 A1 | 3/2010 |
| EP | 2 559 674 A1 | 2/2013 |
| FR | 2 901 270 A1 | 11/2007 |
| FR | 2 928 643 A1 | 9/2009 |
| FR | 2 946 978 A1 | 12/2010 |
| JP | 9-268037 A | 10/1997 |
| JP | 2001-130945 A | 5/2001 |
| WO | WO 98/18740 A1 | 5/1998 |
| WO | WO 2005/097700 A2 | 10/2005 |
| WO | WO 2012/055517 A1 | 5/2012 |
| WO | WO 2013/023727 A2 | 2/2013 |
| WO | WO 2013/023729 A2 | 2/2013 |
| WO | WO 2013/023730 A2 | 2/2013 |
| WO | WO 2013/023731 A2 | 2/2013 |
| WO | WO 2013/023732 A2 | 2/2013 |

OTHER PUBLICATIONS

Beretka et al,. "The Influence of $C_4A_3S$ Content and W/S Ratio on the Performance of Calcium Sulfoaluminate-based Cements", Cement and Concrete Research, vol. 26, No. 11 (1996), pp. 1673-1681.
European Search Report, Appl. No. 11006757.6, Jan. 25, 2012, 9 pgs.
European Search Report, Appl. No. 12001488.1, Jun. 27, 2012, 13 pgs.
European Search Report, Appl. No. 12002111.8, Jun. 27, 2012, 15 pgs.
European Search Report, Appl. No. 12002342.9, Jul. 25, 2012, 13 pgs.
European Search Report, Appl. No. 12003718.9, Oct. 11, 2012, 14 pgs.
International Search Report, PCT/EP2012/002974, Feb. 8, 2013, 3 pgs.
International Search Report, PCT/EP2012/002975, Feb. 8, 2013, 4 pgs.
International Search Report, PCT/EP2012/002976, Feb. 8, 2013, 4 pgs.
International Search Report, PCT/EP2012/002977, Feb. 8, 2013, 3 pgs.
International Search Report, PCT/EP2012/002978, Feb. 8, 2013, 2 pgs.
International Search Report, PCT/EP2012/002979, Feb. 8, 2013, 4 pgs.
Irran et al., "Ternesit, $Ca_5(SiO_4)_2SO_4$, a new Mineral from the Ettringer Bellerberg/Eifel, Germany", Mineralogy and Petrology, vol. 60, No. 1-2 (1997), pp. 121-132.
Kurdowski et al., "Mineral Composition of Build-Up in Cement KILN Preheater", Journal of Thermal Analysis and Calorimetry, vol. 55 (1999), pp. 1021-1029.
Marroccoli et al., "Synthesis of Calcium Sulfoaluminate Cements From $Al_2O_3$-Rich Byproducts From Aluminium Manufacture", 2nd International Conference on Sustainable Construction Materials and Technologies Jun. 28-30, 2010, University Politecnica Delle Marche, Ancona, Italy, No. 2 (2010), pp. 1-9, XP002645670.
Sherman et al., "Long-term behaviour of hydraulic binders based on calcium sulfoaluminate and calcium sulfosilicate", Cement & Concrete Research, vol. 25, No. 1 (1995), pp. 113-126.
Stark, "Zernent and Kalk: Der Baustoff als Werkstoff", Jan. 1, 2000. Birkhauser. Basel, XP002679558, ISBN: 3-7643-6216-2, p. 61.
Belz et al., "Synthesis of Special Cements from Mixtures Containing Fluidized Bed Combustion Waste, Calcium Carbonate and Various Sources of Alumina", 28th Meeting of the Italian Section of the Combustion Institute (2005), pp. I-4-1-I-4-6.
Belz et al., "Fluidized Bed Combustion Waste as a Raw Mix Component for the Manufacture of Calcium Sulphoaluminate Cements", 29th Meeting of the Italian Section of the Combustion Institute (2006), pp. IX4.1-1X4.5.
English translation of International Preliminary Report on Patentability, PCT/EP2012/002974, Feb. 20, 2014.
English translation of International Preliminary Report on Patentability, PCT/EP2012/002975, Feb. 20, 2014.
English translation of International Preliminary Report on Patentability, PCT/EP2012/002976, Feb. 20, 2014.
English translation of International Preliminary Report on Patentability, PCT/EP2012/002977, Feb. 27, 2014.
English translation of International Preliminary Report on Patentability, PCT/EP2012/002978, Feb. 20, 2014.
English translation of International Preliminary Report on Patentability, PCT/EP2012/002979, Feb. 27, 2014.
Jewell et al., "The Fabrication of Value Added Cement Products from Circulating Fluidized Bed Combustion Ash", 2007 World of Coal Ash (WOCA), May 7-10, 2007, Northern Kentucky, USA, 11 pgs.
Kapralik et al., "Phase Changes in the System $CaO$—$Al2O3$—$SiO2$—$Fe2O3$—$MgO$—$CaSO4$—$K2SO4$ in Ar up to 1300° C. referred to Sulphoaluminate Cement Clinker", Br. Ceram. Trans. J., vol. 85 (1986), pp. 131-136.
Sahu et al., "Phase compatibility in the system $CaO$—$SiO2$—$Al2O3$—$Fe2O3$—$SO3$ referred to sulphoaluminate belite cement clinker", Cement and Concrete Research, vol. 23 (1993), pp. 1331-1339.
Bullerjahn, U.S. PTO Office Action, U.S. Appl. No. 14/239,319, Jun. 26, 2014, 18 pgs.
Bullerjahn, U.S. PTO Office Action, U.S. Appl. No. 14/238,872, Jul. 21, 2014, 14 pgs.
Bullerjahn, U.S. PTO Office Action, U.S. Appl. No. 14/239,348, Jun. 30, 2014, 15 pgs.
Beretka et al. "Synthesis and Properties of Low Energy Cements based on C4A3S", 9th International Congress on the Chemistry of Cement (1992), pp. 195-200.
Beretka et al., "Utilisation of industrial wastes and by-products for the synthesis of special cements", Resources, Conservation and Recycling, vol. 9 (1993), pp. 179-190.
Calos et al., Structure of Calcium Aluminate Sulfate Ca4Al6O16S, Journal of Solid State Chemistry, vol. 119 (1995), pp. 1-7.
Schmidt et al. "Quantification of Calcium Sulpho-Aluminate Cement by Rietveld Analysis", Materials Science Forum, vols. 321-324 (2000), pp. 1022-1027.
Bullerjahn, U.S. PTO Notice of Allowance, U.S. Appl. No. 14/238,872, Dec. 16, 2014, 14 pgs.
Bullerjahn, U.S. PTO Notice of Allowance, U.S. Appl. No. 14/239,319, Dec. 29, 2014, 13 pgs.
Bullerjahn, U.S. PTO Notice of Allowance, U.S. Appl. No. 14/239,348, Jan. 5, 2015, 11 pgs.
Chinese Office Action and English translation thereof, Appl. No. 201280040099.7, Feb. 13, 2015, 21 pgs.
Chinese Search Report and English Translation thereof, Appl. No. 201280040006.0, Apr. 28, 2015, 4 pgs.
Chinese Office Action and English translation thereof, Appl. No. 201280040095.9, Mar. 19, 2015, 16 pgs.
Bullerjahn, U.S. PTO Office Action, U.S. Appl. No. 14/238,947, Mar. 25, 2015, 21 pgs.

(56) References Cited

OTHER PUBLICATIONS

Bullerjahn, U.S. PTO Office Action, U.S. Appl. No. 14/238,976, Apr. 16, 2015, 22 pgs.
Japanese Office Action, Application No. 2014-525336, Mar. 3, 2015, 4 pgs.
Odler, Special Inorganic Cements:, (2000), pp. 65, 66, 78, ISBN: 0-419-22790-3, https://books.google.co.jp/books?id=p6YTKgk8mBgC&pg=PA66&dq=C4A3&f=false.
Makhmudova et al., "Synthesis and Properties of Sulphoferrite Calcium Clinkers and Low Temperature Cements on their Basis", Journal of the University of Chemical Technology and Metallurgy, vol. 46, No. 2 (2011), pp. 151-154.
"CaO-Al2O3-SO3-SiO2", P051045:10946, Mar. 11, 2015, pp. 95-98.
Li et al., "Microwave sintering of sulphoaluminate cement with utility wastes", Cement and Concrete Research, vol. 31, No. 9 (2001), pp. 1257-1261.
Bullerjahn, U.S. PTO Notice of Allowance, U.S. Appl. No. 14/239,319, May 8, 2015, 11 pgs.
Bullerjahn, U.S. PTO Notice of Allowance, U.S. Appl. No. 14/239,348, May 12, 2015, 11 pgs.
Bullerjahn, U.S. PTO Notice of Allowance, U.S. Appl. No. 14/238,872, May 8, 2015, 12 pgs.

* cited by examiner

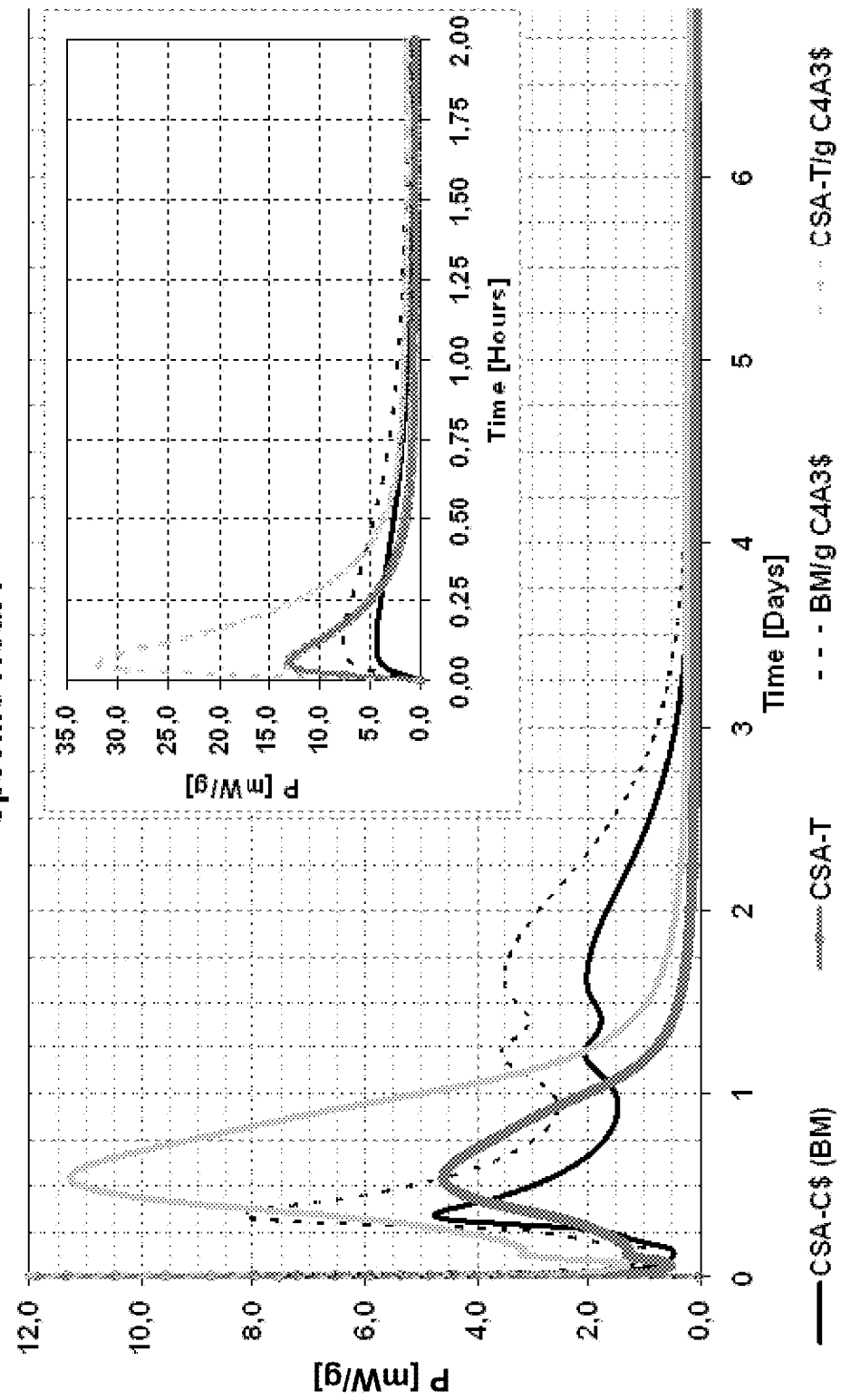
Figure 1a: Heat flow of hardened cement pastes CSA-C$ and CSA-T

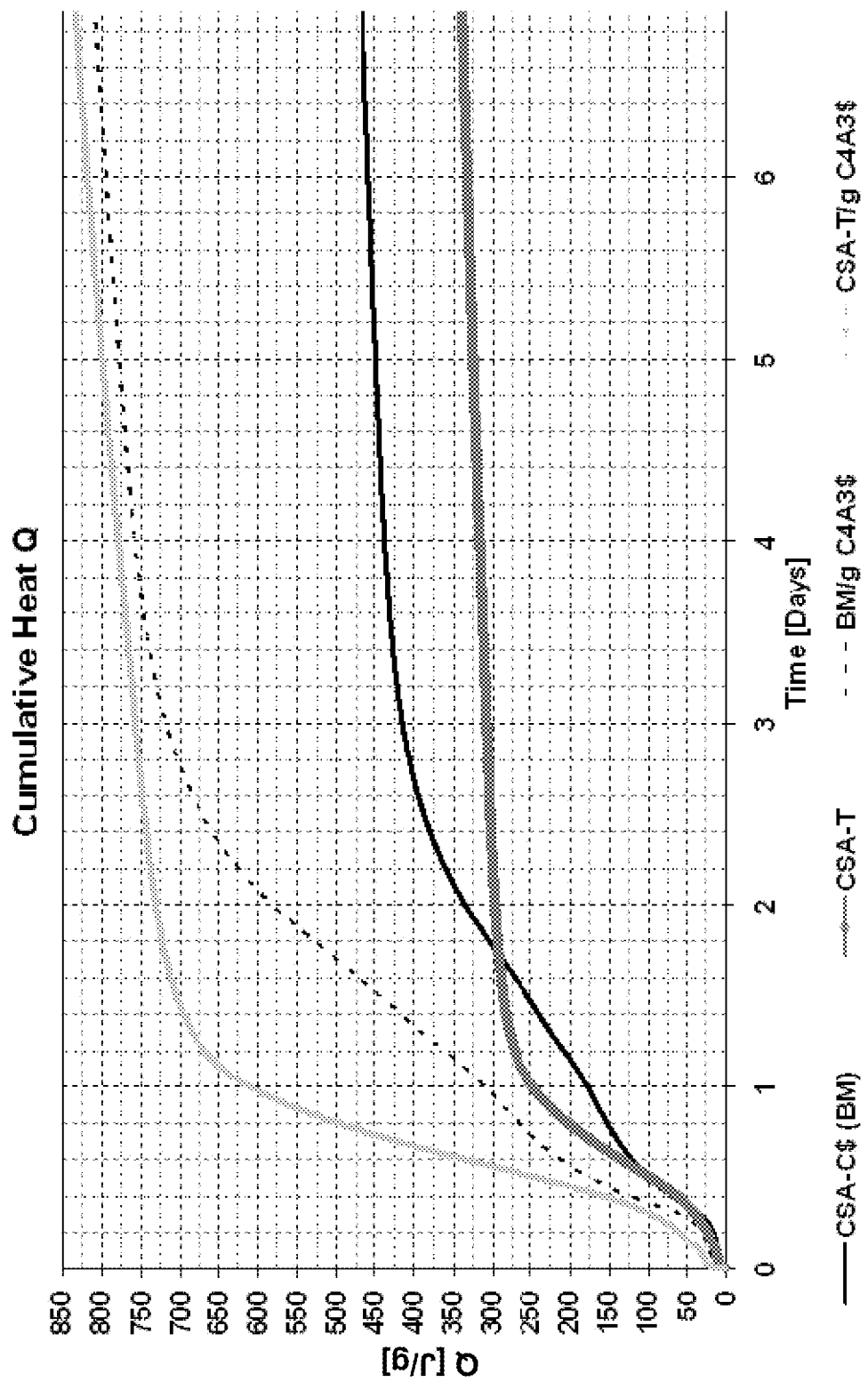
Figure 1b: Cumulative heat flow of hardened cement pastes CSA-C$ and CSA-T

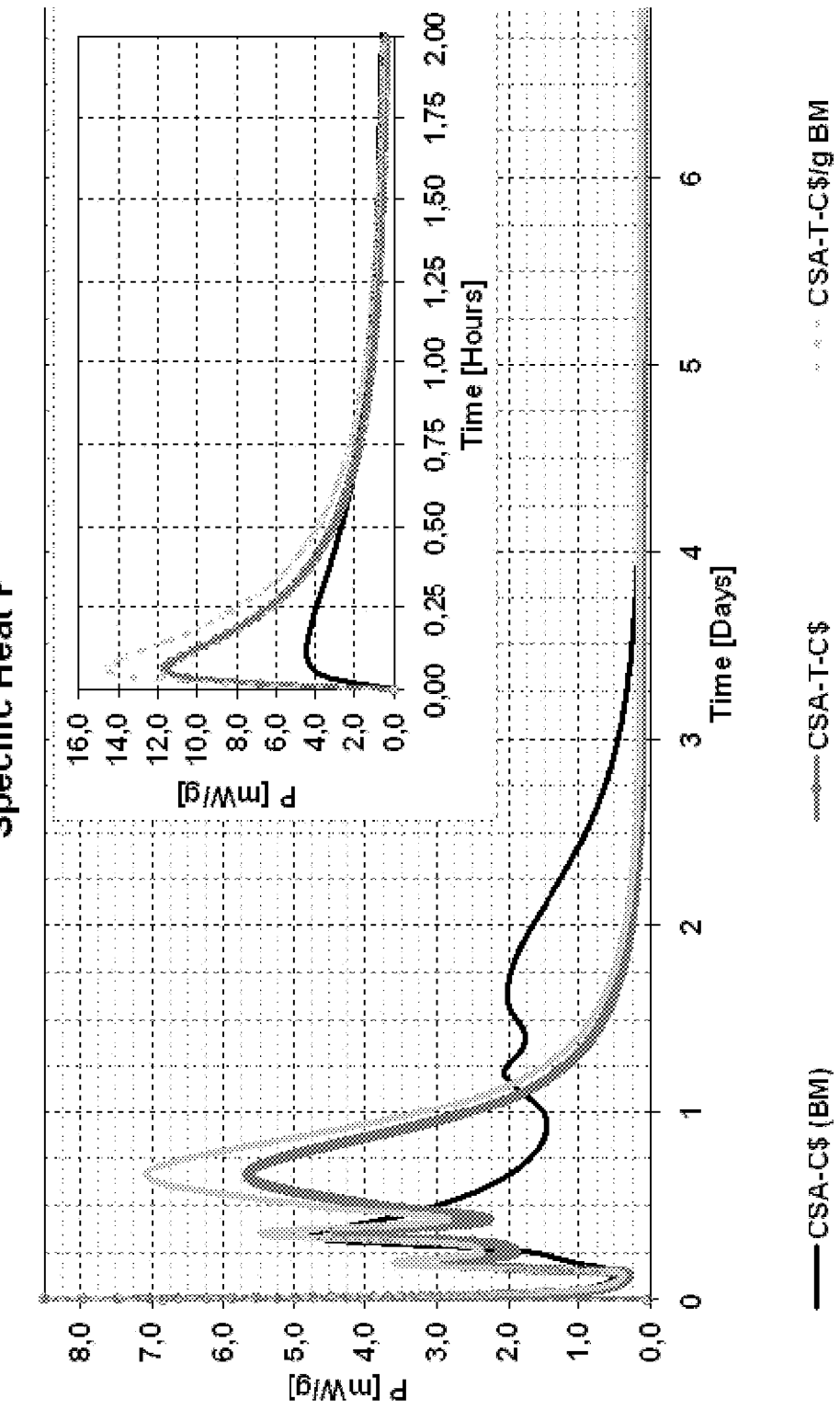
Figure 2a: Heat flow of hardened cement pastes CSA-C$ and CSA-T

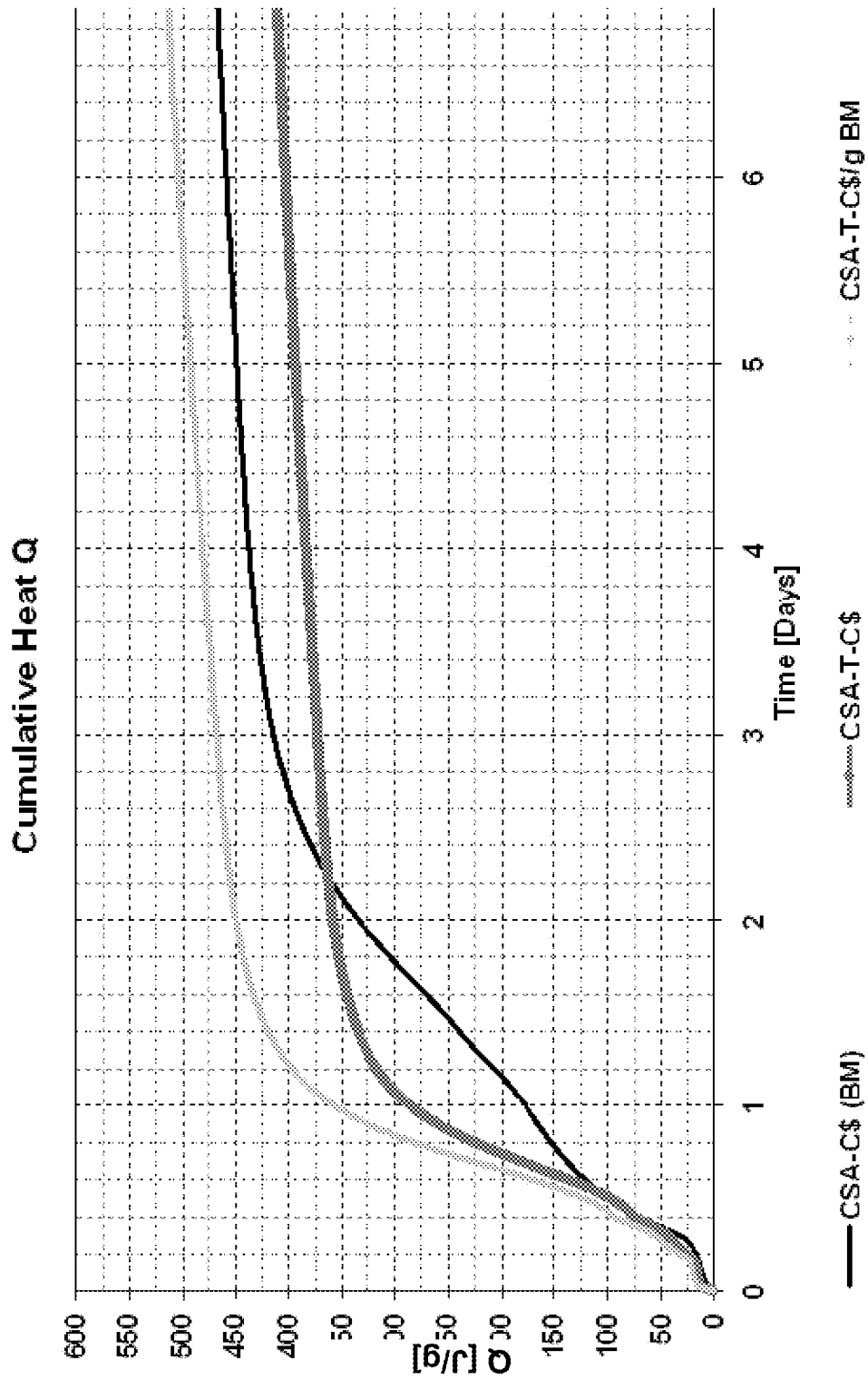
Figure 2b: cumulative heat flow of hardened cement pastes CSA-C$ and CSA-T

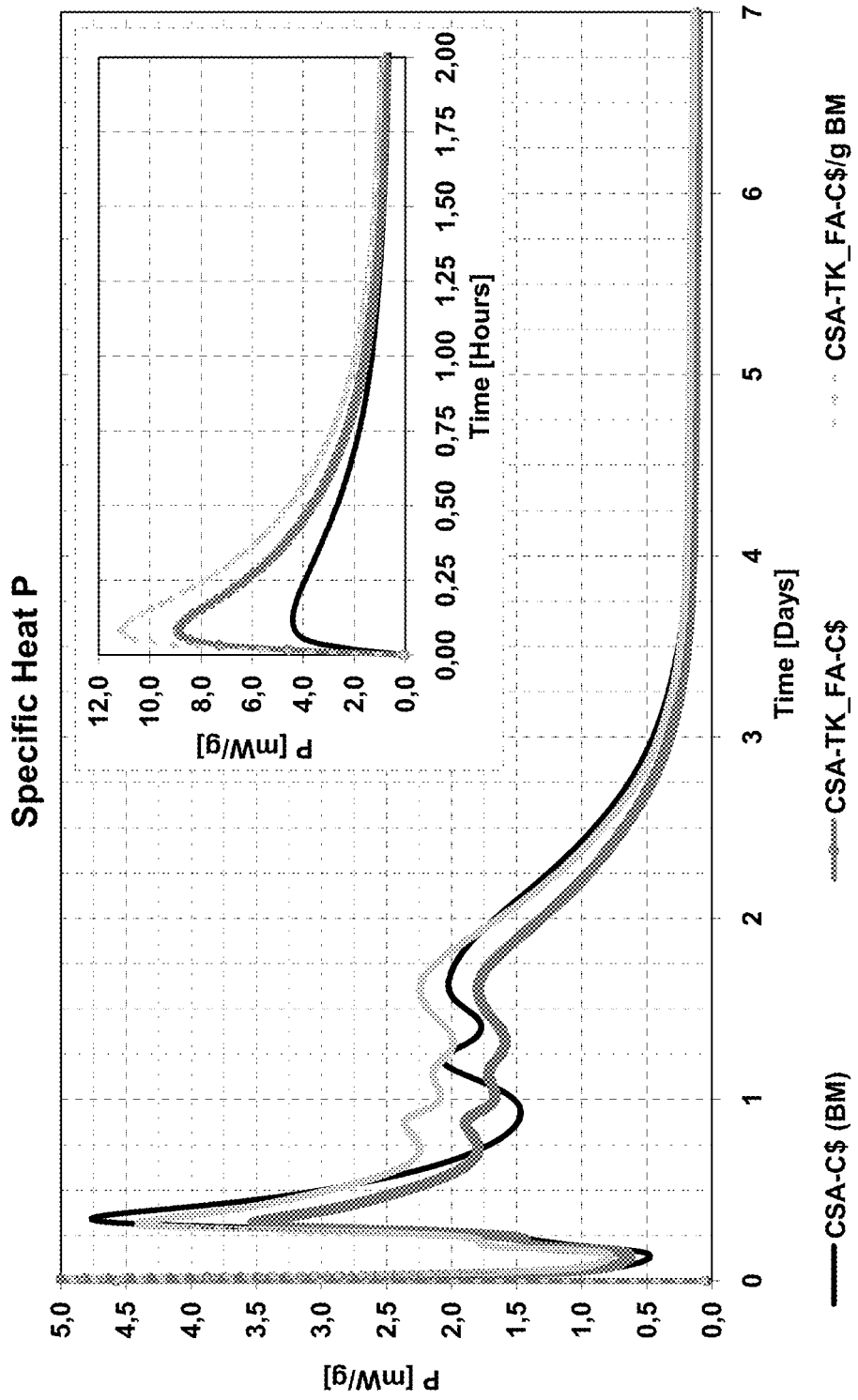
Figure 3a: Heat flow of hardened cement pastes CSA-C$ and CSA-TK_FA-C$

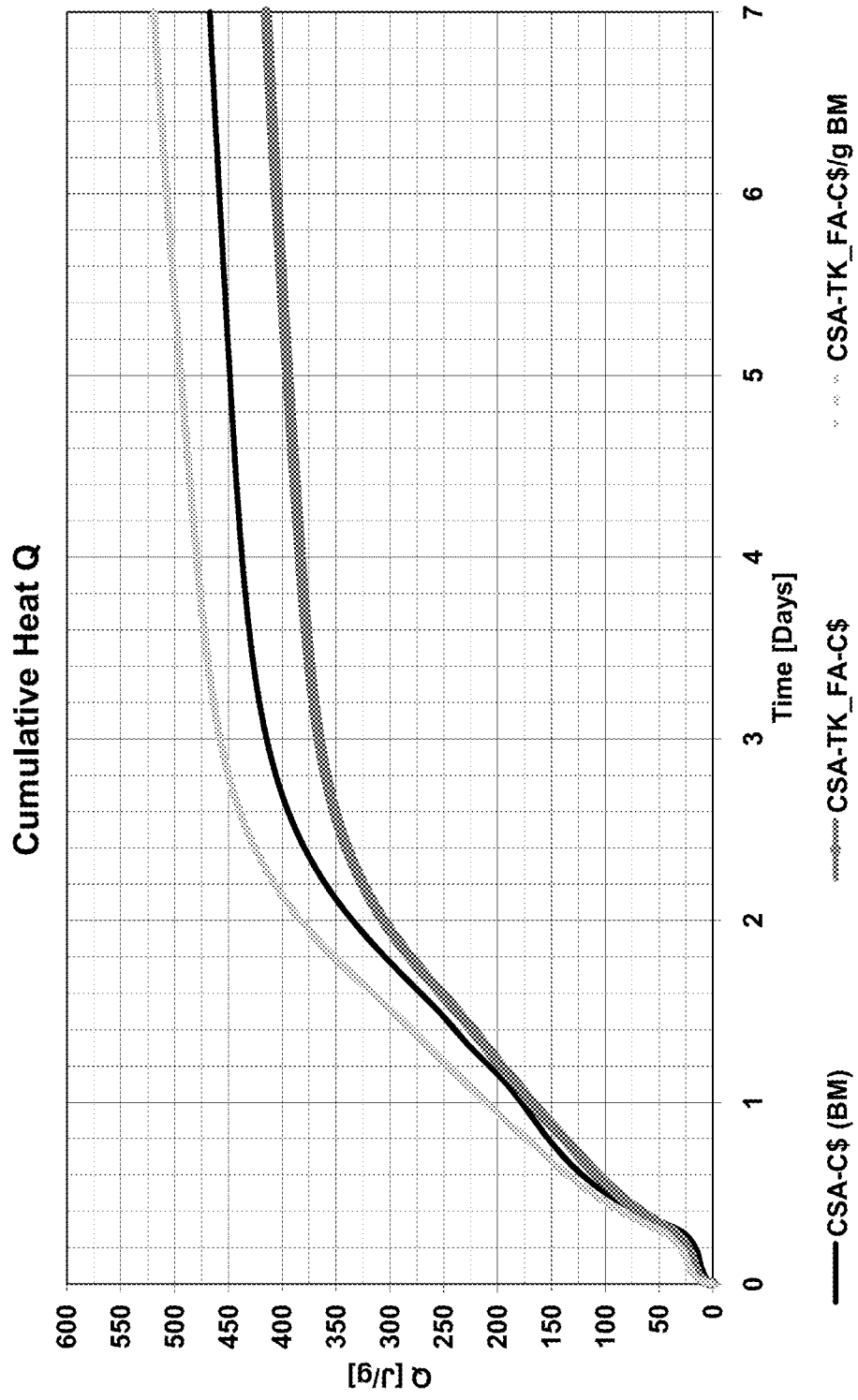

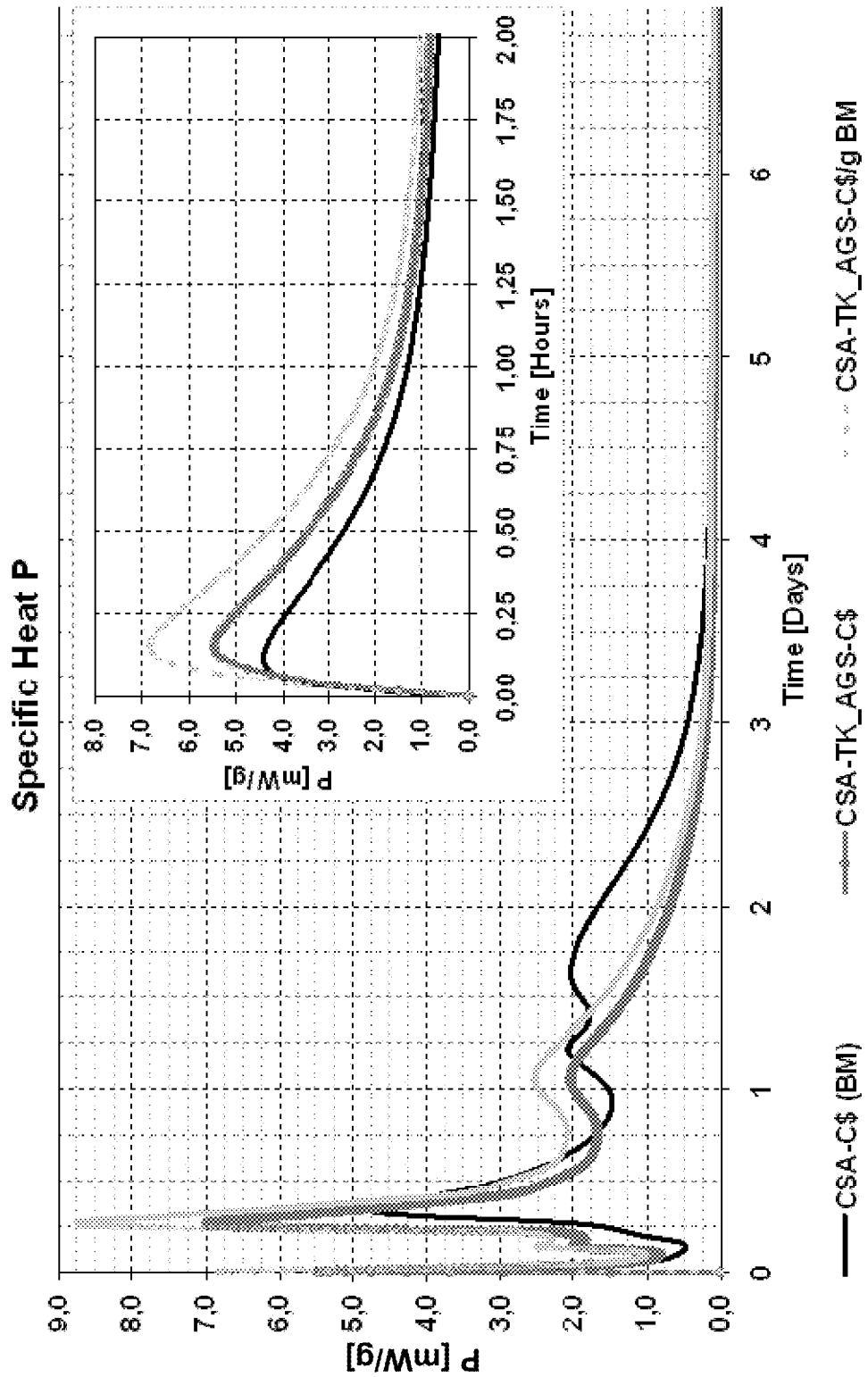
Figure 4a: Heat flow of hardened cement pastes CSA-C$ and CSA-TK_AGS-C$

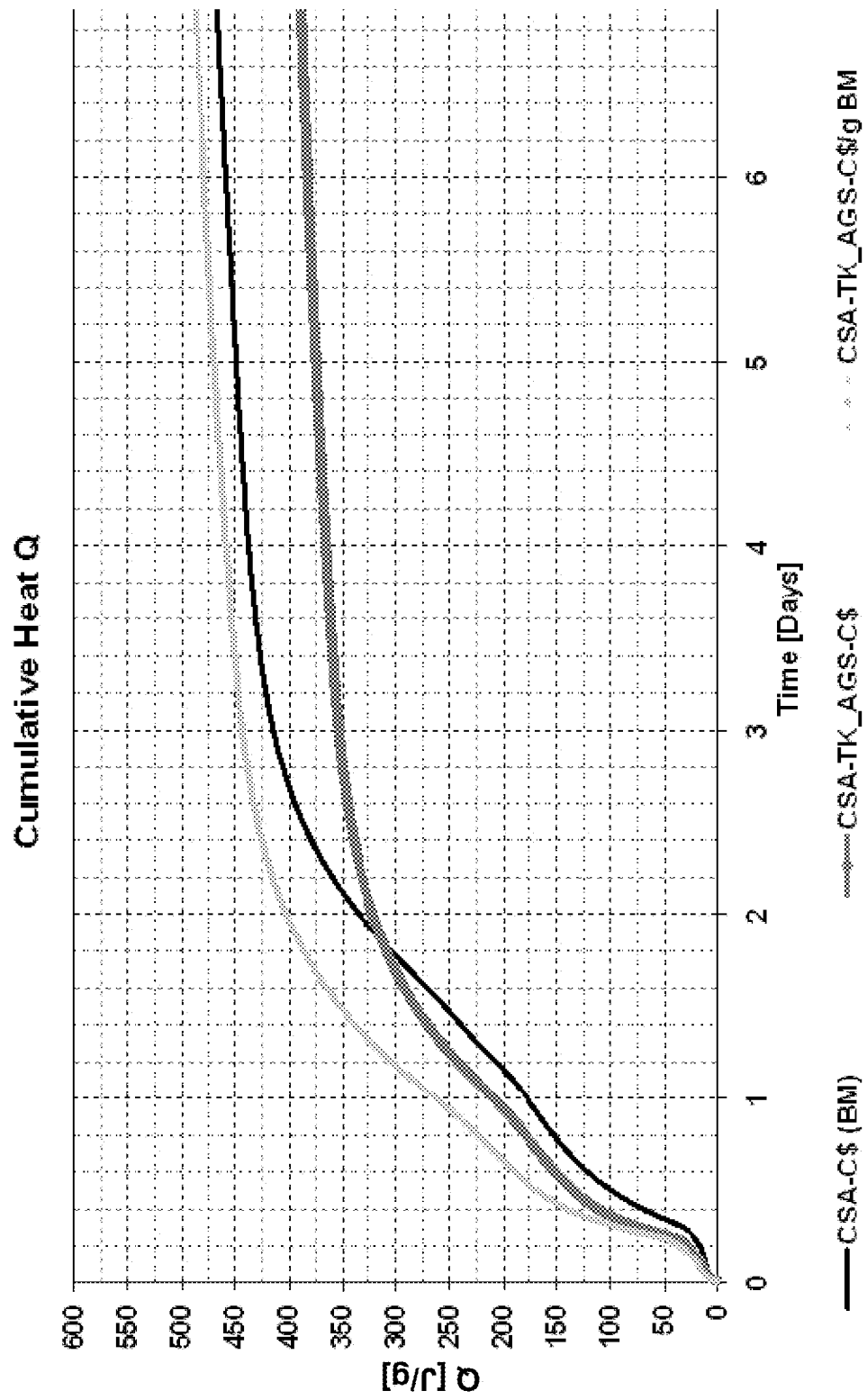
Figure 4b: Cumulative heat flow of hardened cement pastes CSA-C$ and CSA-TK_AGS-C$

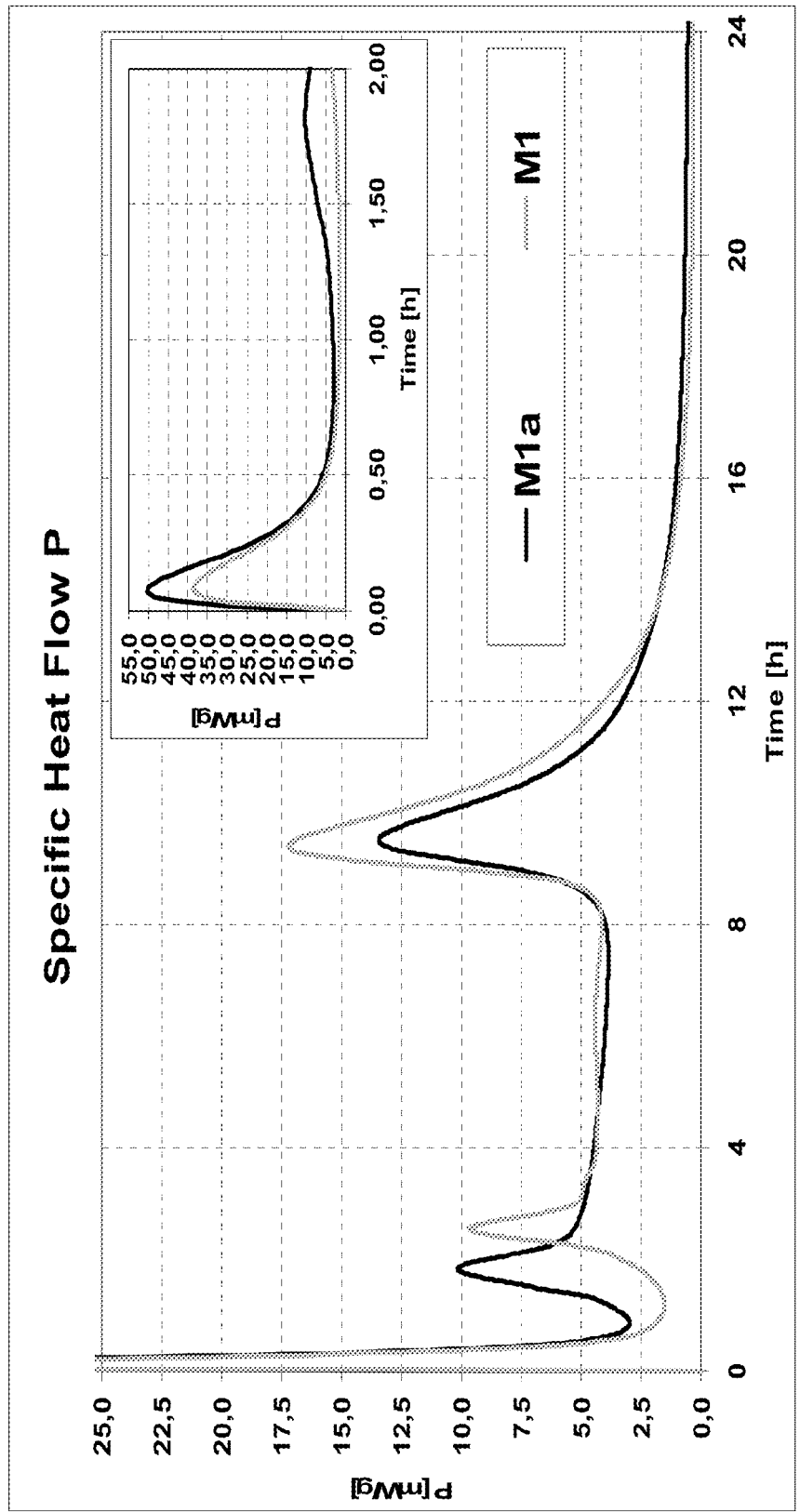
Figure 5a: Heat flow of hardened cement pastes M1 and M1a

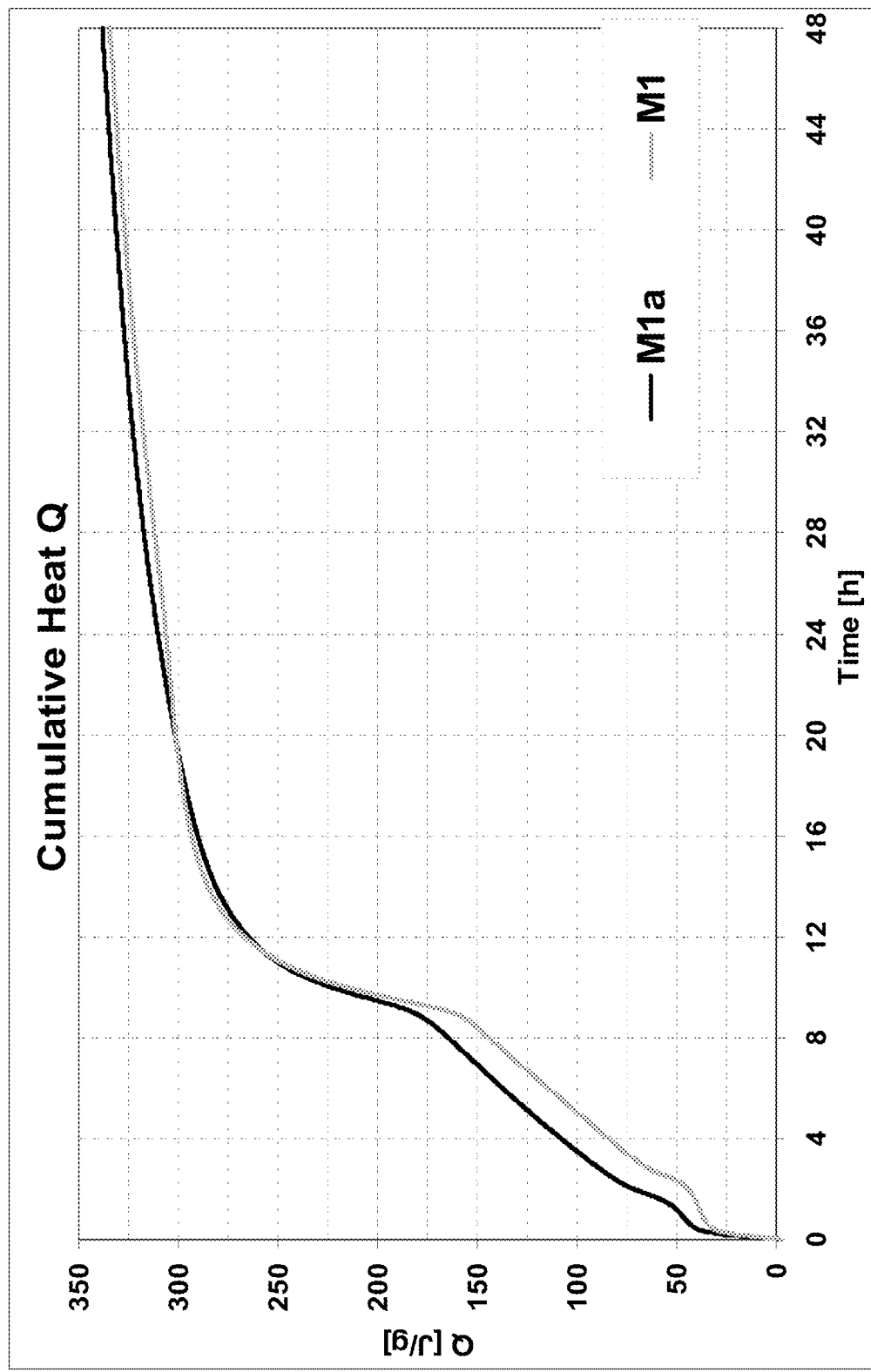
Figure 5b: Cumulative heat flow of hardened cement pastes M1 and M1a

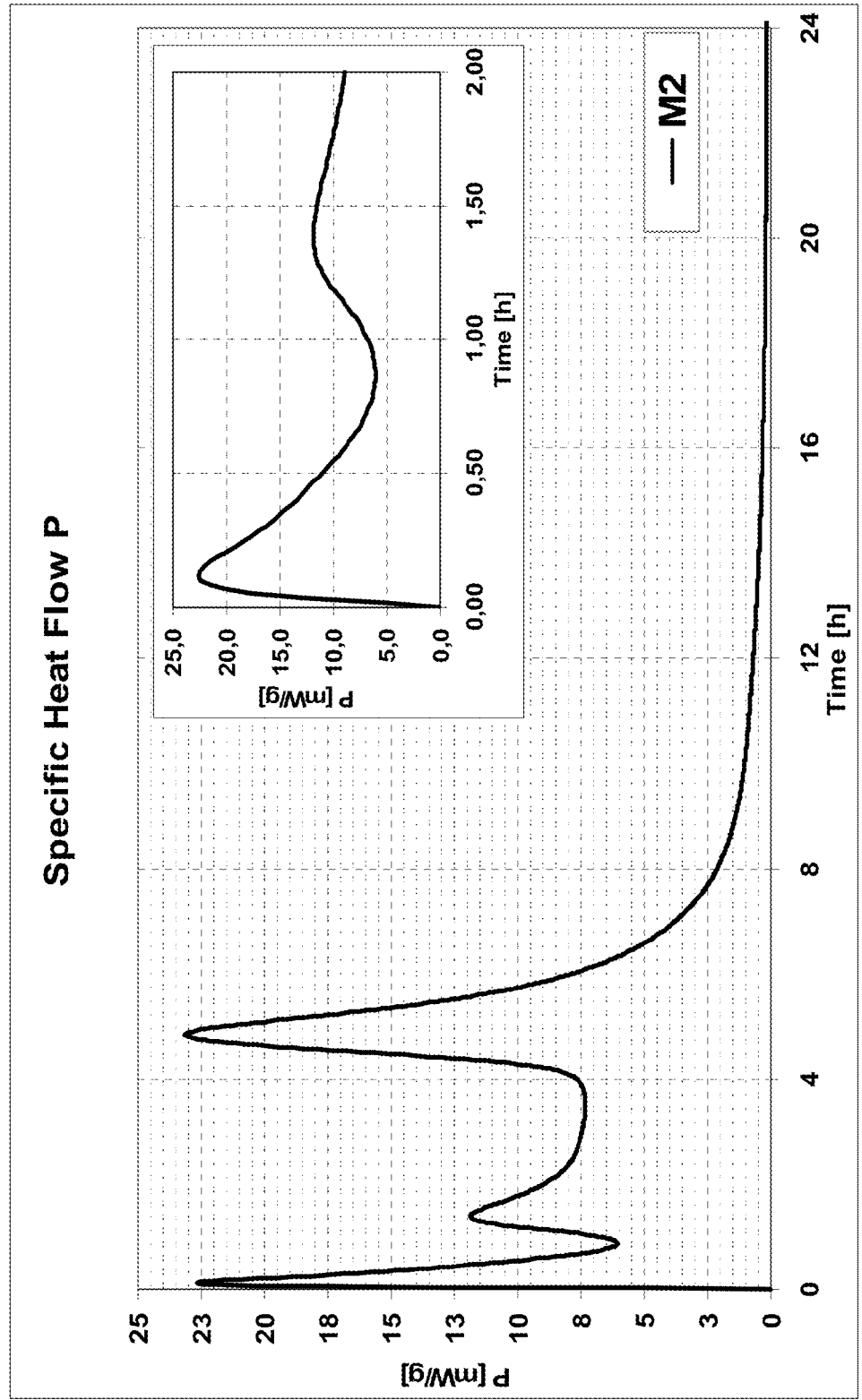
Figure 6a: Heat flow of hardened cement paste M2

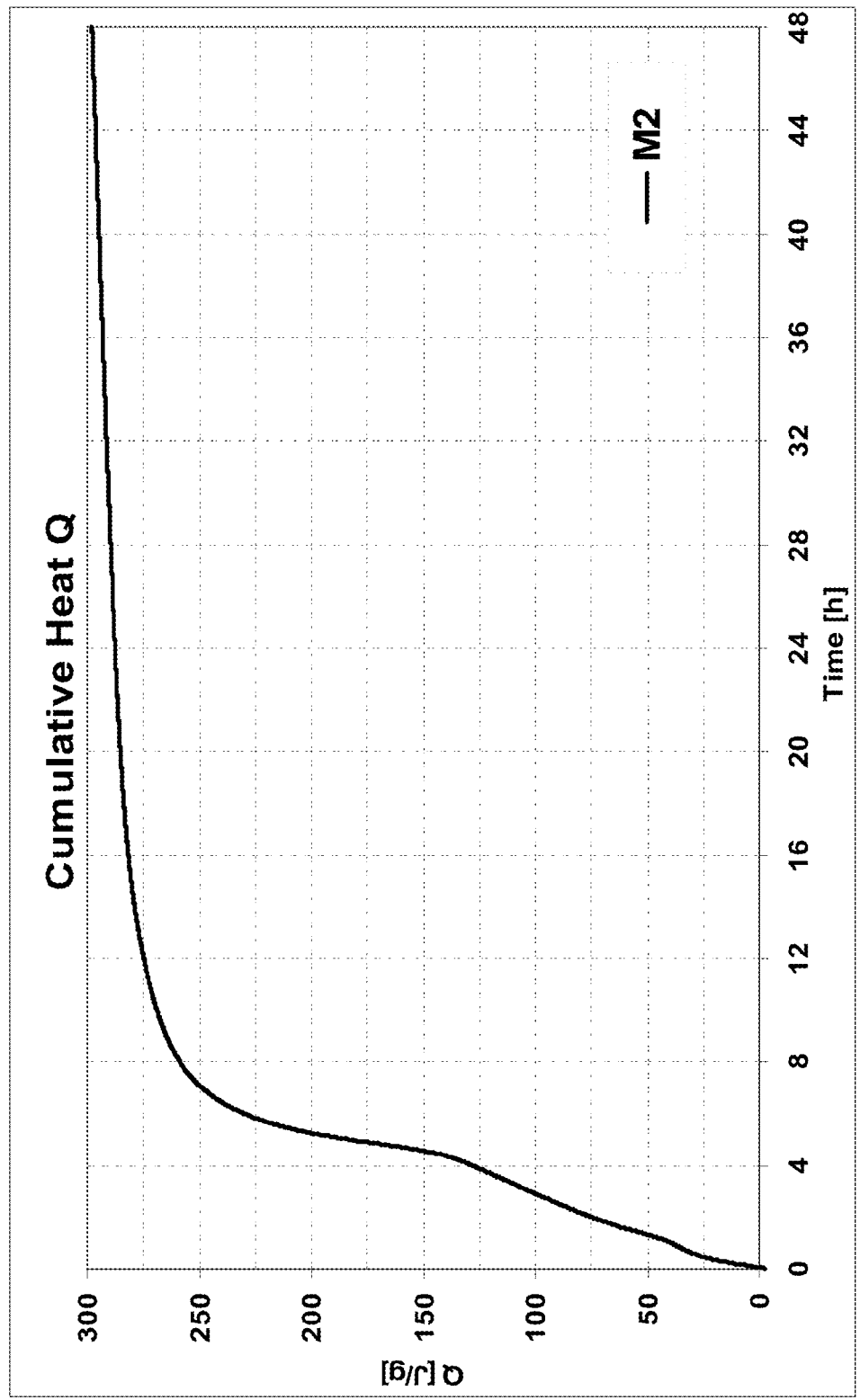
Figure 6b: Cumulative heat flow of hardened cement paste M2

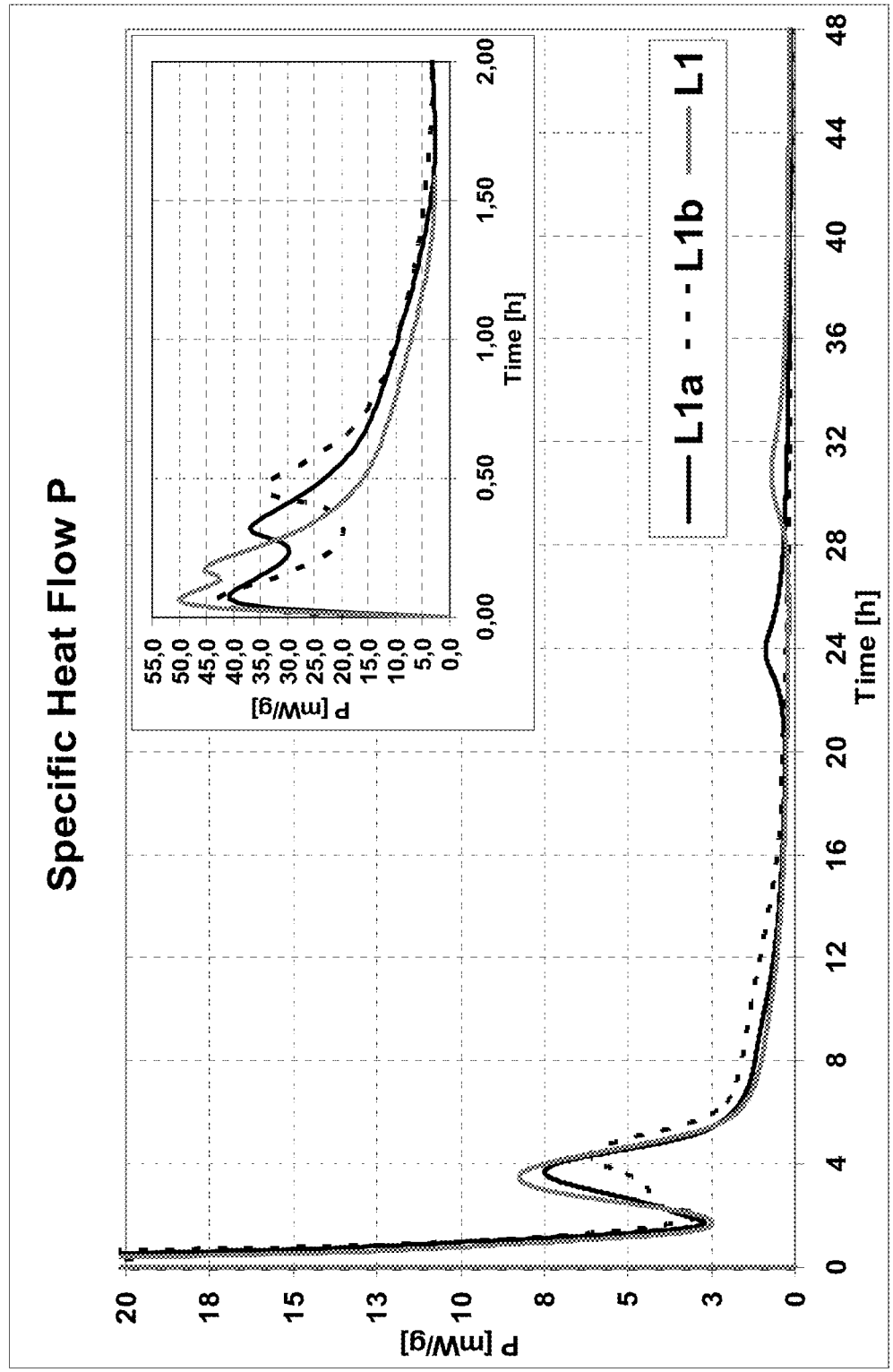
Figure 7a: Heat flow of hardened cement pastes L1, L1a, L1b

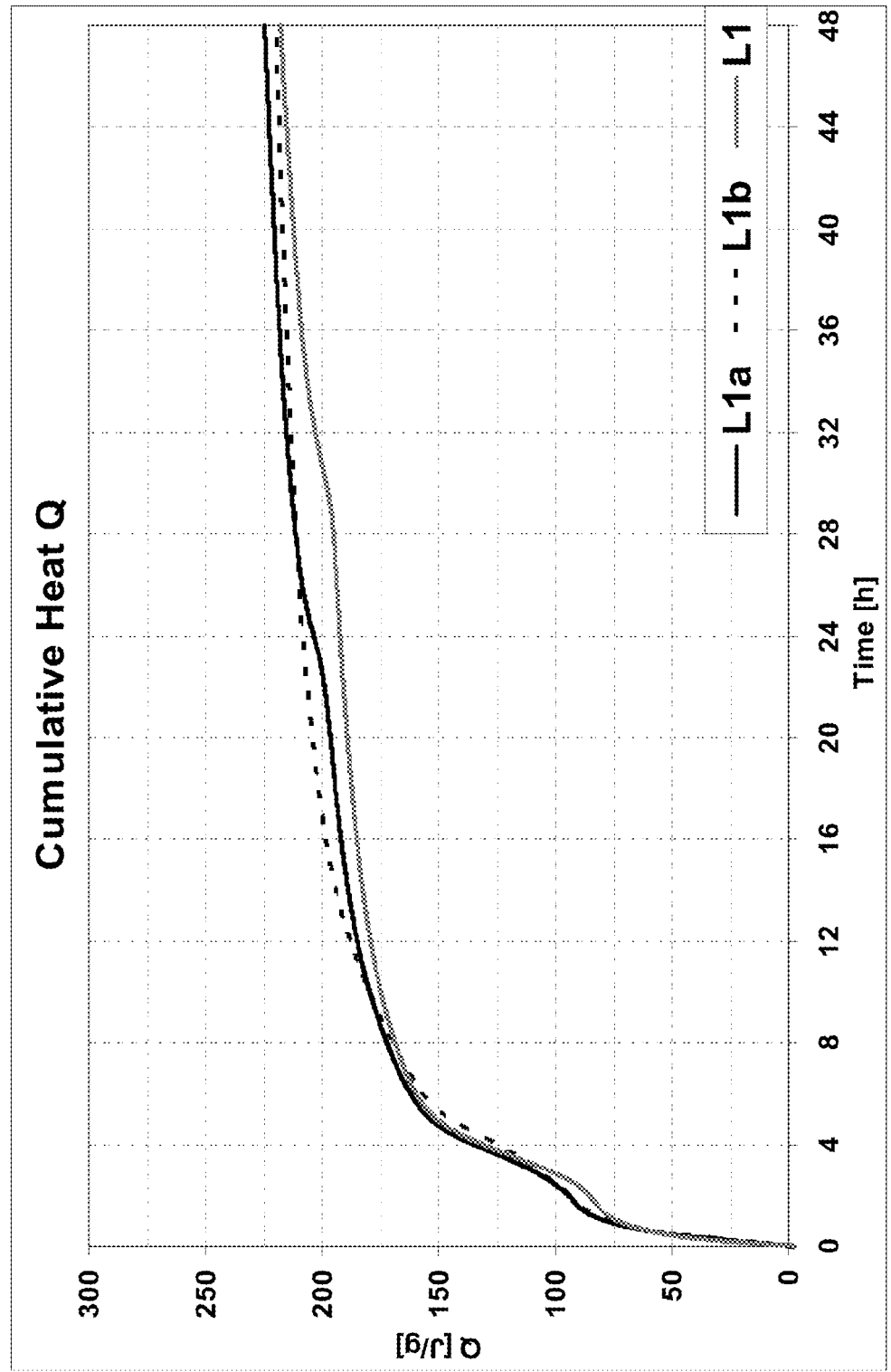
Figure 7b: Cumulative Heat flow of hardened cement pastes L1, L1a, L1b

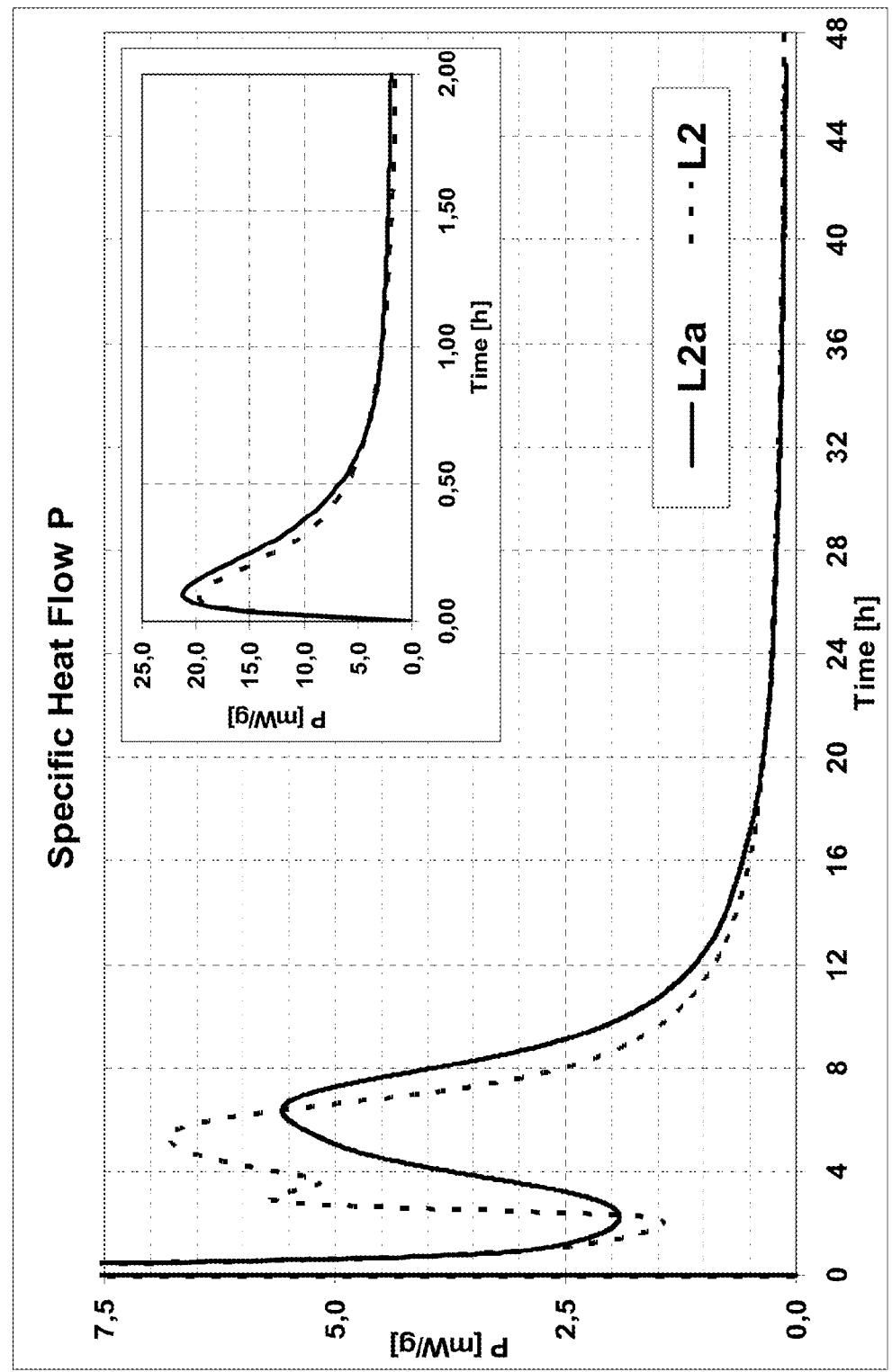
Figure 8a: Heat flow of hardened cement pastes L2, L2a

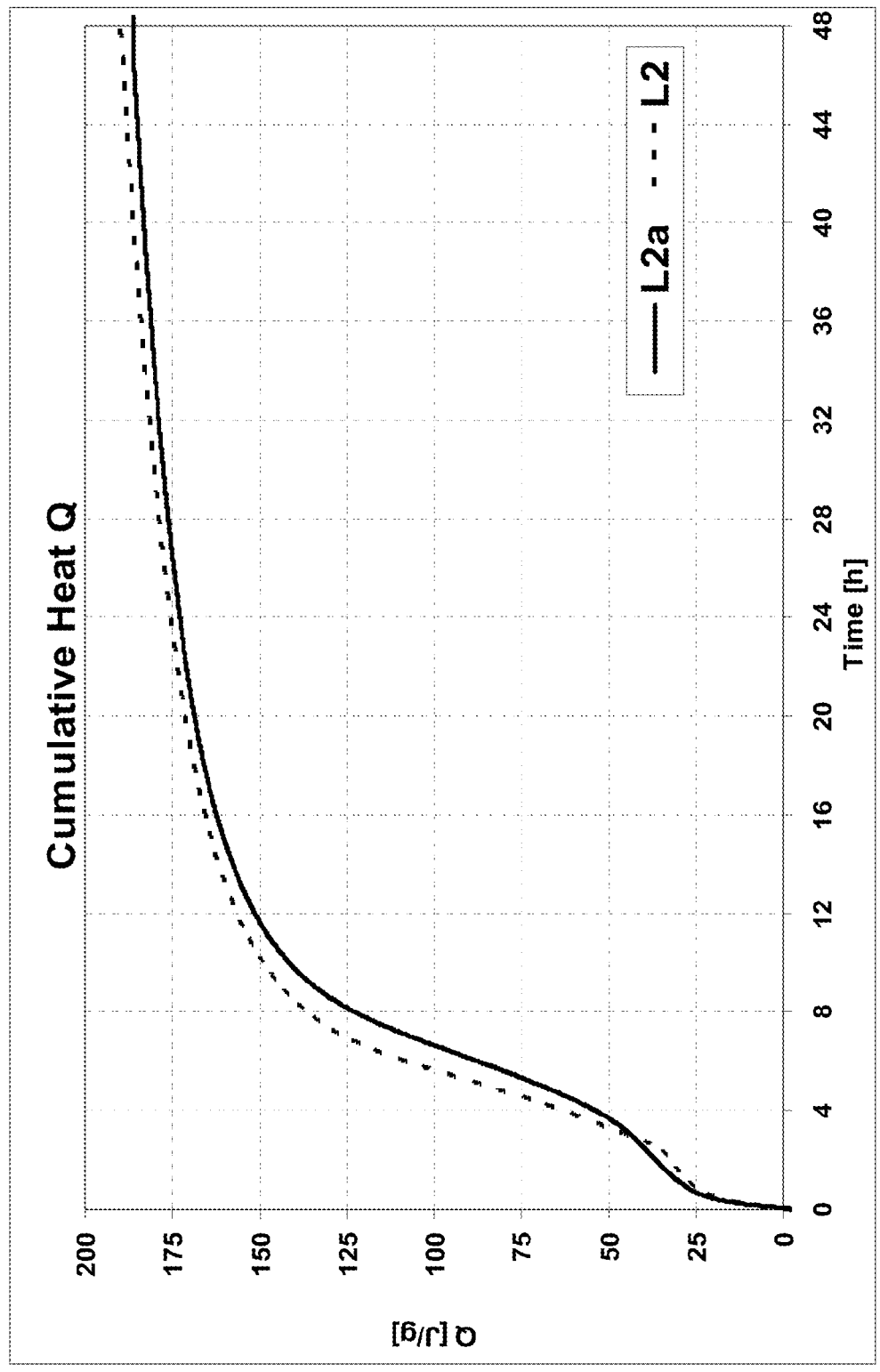
Figure 8b: Cumulative heat flow of hardened cement pastes L2, L2a

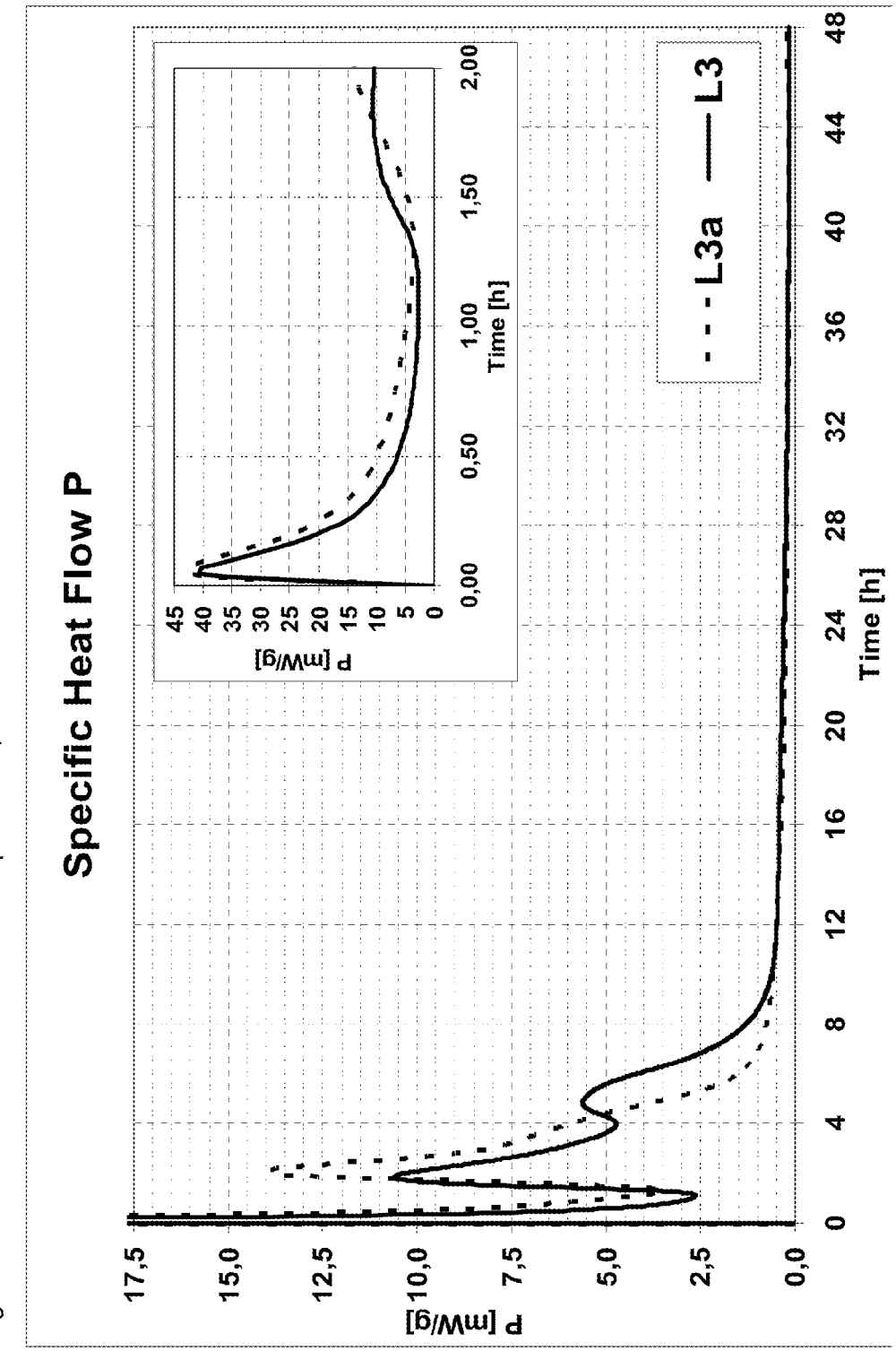
Figure 9a: Heat flow of hardened cement pastes L3, L3a

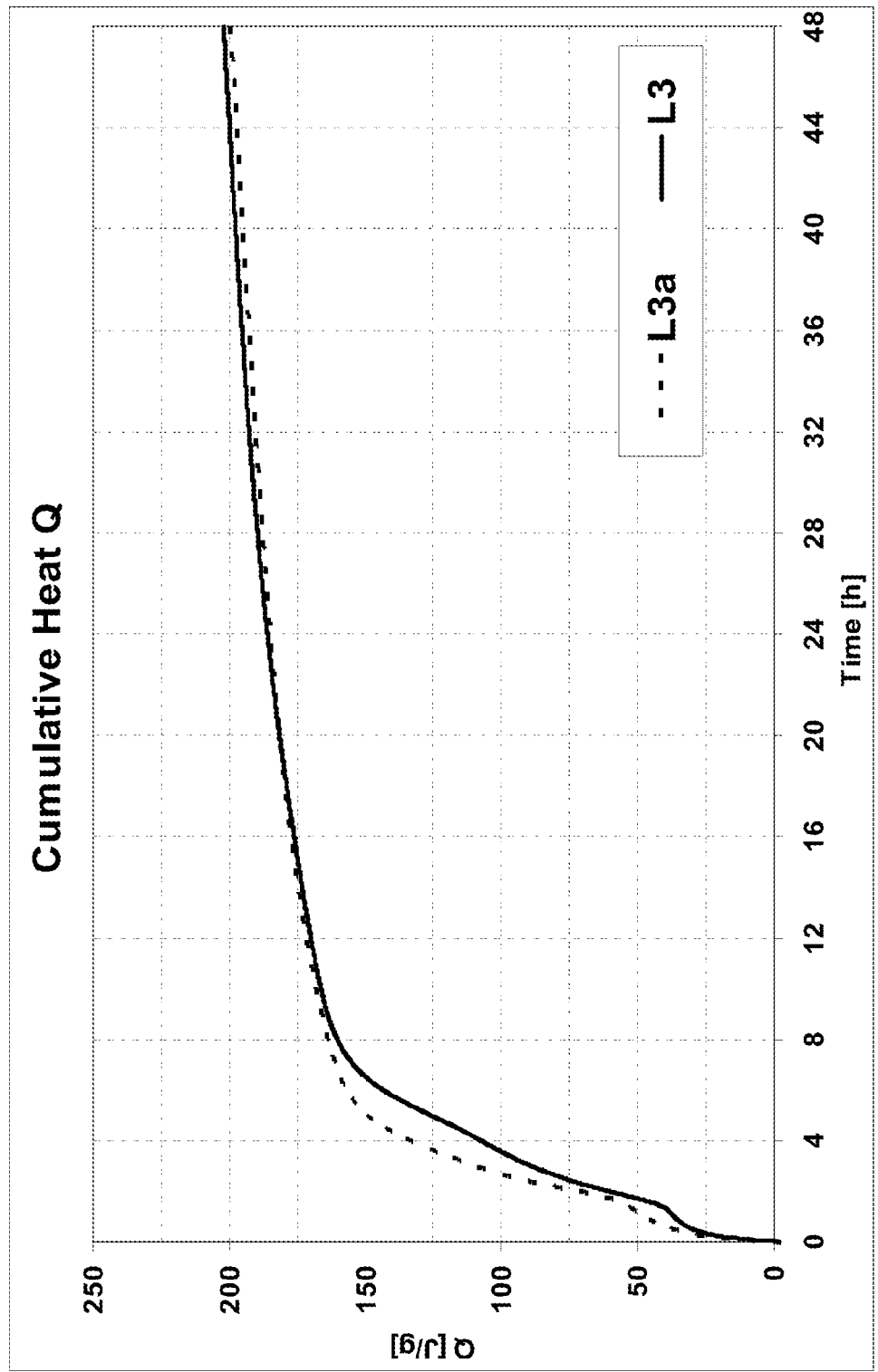
Figure 9b: Cumulative heat flow of hardened cement pastes L3, L3a

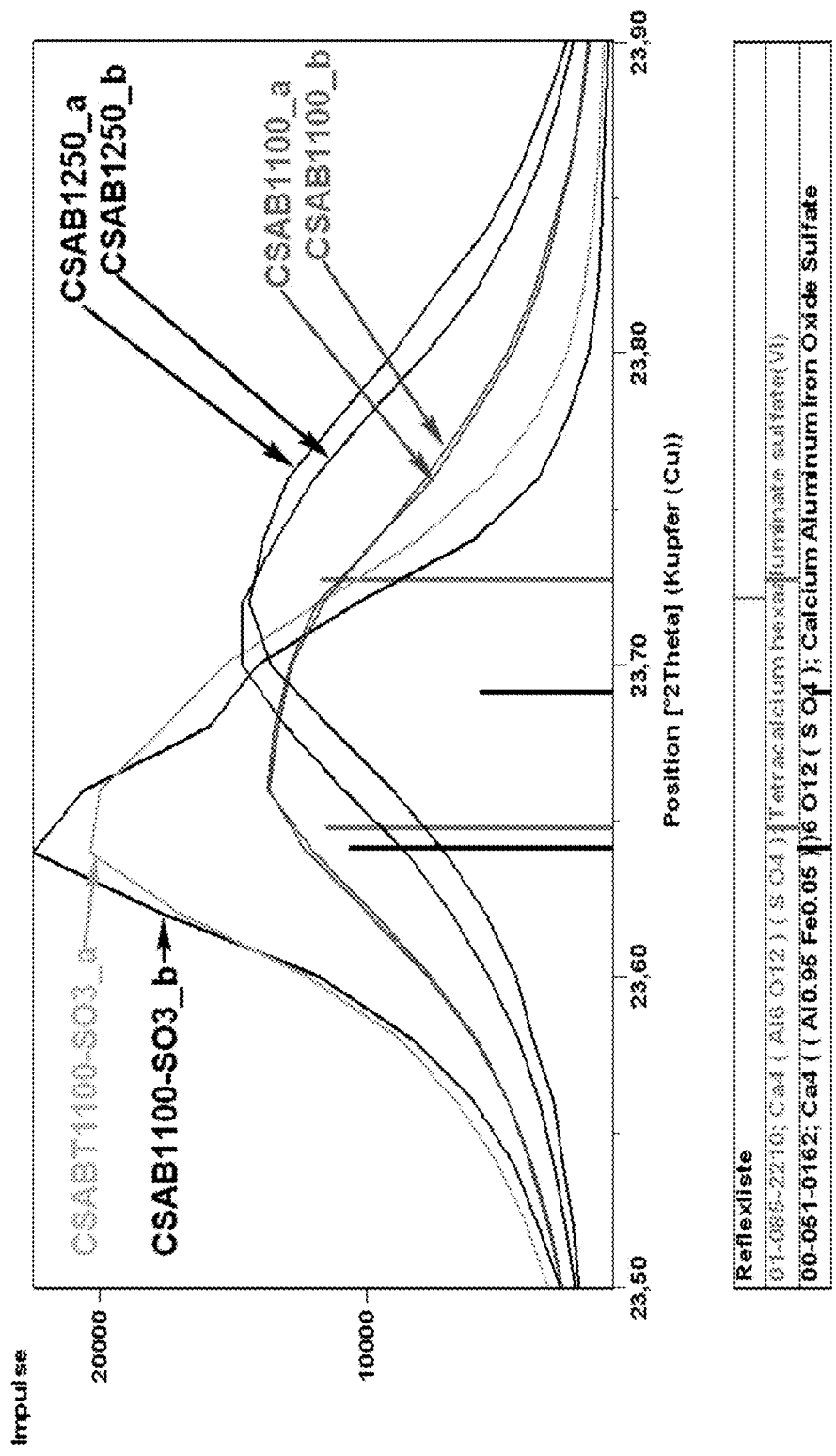
Figure 10: Peak position offset based on the synthesis temperature and the specific cooling program as well as the SO3 content

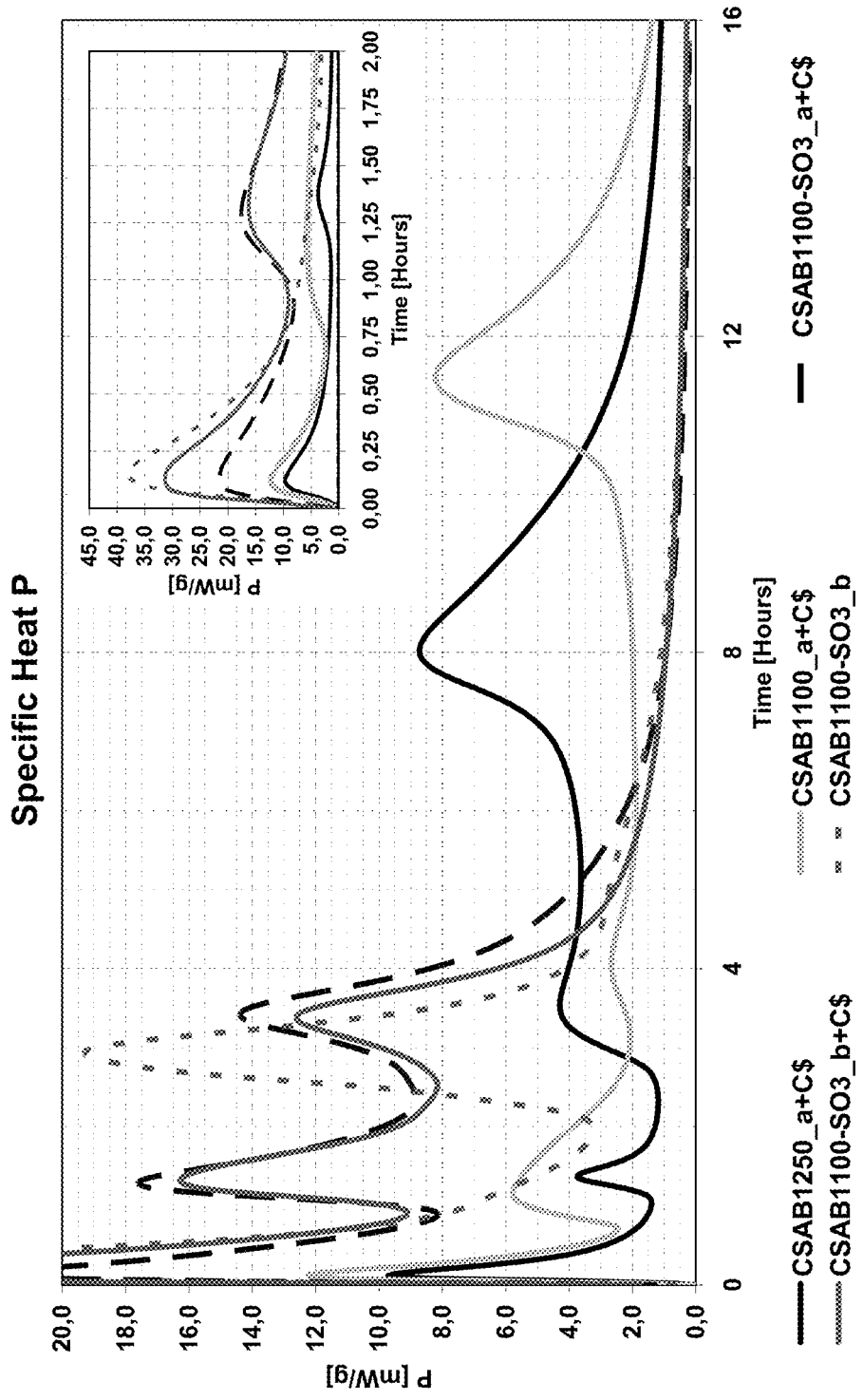
Figure 11: Heat flow of hardened cement pastes from mixtures of the clinkers according to example 10

CALCIUM SULFOALUMINATE CEMENT WITH TERNESITE

CROSS-REFERENCE TO RELATED PATENT APPLICATIONS

This application is a National Stage of International Application No. PCT/EP2012/002975, filed Jul. 16, 2012, which is based upon and claims the benefit of priority from prior European Patent Applications No. 11006757.6, filed Aug. 18, 2011, No. 11008570.1, filed Oct. 26, 2011, No. 12001488.1, filed Mar. 5, 2012, No. 12002111.8, filed Mar. 26, 2012, No. 12002342.9, filed Mar. 30, 2012, and No. 12003718.9, filed May 10, 2012, the entire contents of all of which are incorporated herein by reference in their entirety.

The present invention relates to a ternesite belite calcium sulfoaluminate clinker, cement and binder, as well as to ternesite as an additive to calcium sulfoaluminate (ferrite) (belite) clinker (CSA(F)(B)), cement and binders.

The cement industry accounts for a considerable proportion of the global production of $CO_2$. Over the last few years, the worldwide growing demand for cement, notably in developing countries, as well as rising costs for raw materials, energy and $CO_2$ certificates have resulted in an increasing reduction of the clinker factor, for example by adding limestone powders, fly ashes and granulated blast furnace slags as clinker replacement materials. This use of byproducts and waste products from other industries as well as the development of alternative binders are increasingly becoming the focus of attention in politics, science and business.

Around the world, enormous amounts of materials are incurred as part of thermal waste disposal/energy generation, steel production, noble metal extraction, etc., is which hereinafter will be referred to as industrial byproducts. Depending on the quality/composition/field of application, some or all of these can be reused in various processes and products, for example as correcting agents for clinker production for Portland cement, as additives for concrete, and as aggregates for asphalt and concrete, etc.

However, due to various factors, for example the lack of uniformity (chemism and mineralogy) and the content of harmful substances (organic chemistry, heavy metals, etc.), the use of industrial byproducts entails some problems. Among other things, a decreasing reactivity/quality of OPC clinkers or insufficient volume stability of cements can cause large quantities of such materials to be disposed of at great expense every year or used as waste dump materials and landfill materials. Difficulties can also occur with the disposal of such materials, for example leaching processes may contaminate surrounding areas and water systems/groundwater. The use/treatment of industrial byproducts thus constitutes a major challenge and a problem that has yet to be resolved. In the future, the most efficient and sustainable use of resources will be indispensable and have relevance around the world.

Besides the substitution of clinker in cement and of raw materials in the raw meal mixture, attempts have also been made to find other hydraulically hardening binders. These include calcium sulfoaluminate cements and cements containing belite as a main component.

The following abbreviations, which are common in the cement industry, will be used: H—$H_2O$, C—CaO, A—$Al_2O_3$, F—$Fe_2O_3$, M—MgO, S—$SiO_2$ and \$-$SO_3$.

So as to simplify the further description, compounds are generally indicated in the pure forms thereof, without explicitly stating series of solid solutions/substitution by foreign ions and the like, as are customary in technical and industrial materials. As any person skilled in the art will understand, the composition of the phases is mentioned by name in the present invention may vary, depending on the chemism of the raw meal and the type of production, due to the substitution with various foreign ions, such compounds likewise being covered by the scope of protection of the present invention and being included by the designation of the pure phases/compounds.

PRIOR ART

On an industrial scale, calcium sulfoaluminate cement is normally produced by the sintering of homogenized, fine-particulate, natural raw materials, such as limestone, bauxite, gypsum/hemihydrate/anhydrite, aluminum-rich clay and a $SiO_2$ source, in a rotary kiln between 1100° C. and 1350° C. and has a significantly different chemism and phase content compared to Portland cement. Table 1 compares the phases present in Portland cement (OPC) and sulfoaluminate cement (BCSAF). Different industrial byproducts, such as ground granulated blast furnace slag and fly ashes, can also be added to the raw meal of sulfoaluminate cement.

TABLE 1

Chemism and Mineralogy of OPC compared to BCSA(F)

| | Temperature [° C.] | Chem. Composition [%] | Miner. Composition [%] |
|---|---|---|---|
| OPC | ~1450 | CaO [55-75] | $C_3S$ [50-70] |
| | | $SiO_2$ [15-25] | $C_2S$ [10-40] |
| | | $Al_2O_3$ [2-6] | $C_3A$ [0-15] |
| | | $Fe_2O_3$ [0-6] | $C_4AF$ [0-20] |
| | | $SO_3$ [1.5-4.5] | C\$ [2-10] |
| | | | C [0-3] |
| | | | Cc [0-5] |
| BCSAF | ~1250 | CaO [40-70] | $C_2S$ [2-70] |
| | | $SiO_2$ [2-40] | $C_4A_3$\$ [10-75] |
| | | $Al_2O_3$ [5-40] | $C_4AF$ [0-30] |
| | | $Fe_2O_3$ [0-15] | C\$ [5-30] |
| | | $SO_3$ [5-25] | Secondary phases |

A key, hydraulically active component of calcium sulfoaluminate cement is a (mixed) crystal of the compounds of following composition 3 CaO.3 $Al_2O_3$. $CaSO_4$-3 CaO.3 $Fe_2O_3$.$CaSO_4$ ($C_4A_3$\$-$C_4F_3$\$; sulfoaluminate-sulfoferrite, ye'elimite), which, once mixed with water and in the presence of soluble sulfates and additional calcium carriers, reacts to form ettringite, 3 CaO.($Al_2O_3$/$Fe_2O_3$). 3 $CaSO_4$.32 $H_2O$, as well as different monophases. The (hydrate) phases formed (for example ettringite [$AF_t$], monophases [$AF_m$], etc.) can bind and permanently fix a large number of different (harmful) substances, for example by the incorporation into the crystal structure of the hydrate phase, agglomeration at particle surfaces, fixing in the cement lime, precipitation, for example as hydroxides/carbonates, and the like. Two further hydraulically active phases of the calcium sulfoaluminate cement are dicalcium silicate ($C_2S$) and tetracalciumaluminate ferrite ($C_4AF$), which primary contribute to final strength, however.

EP 0 838 443 A1 describes the production of calcium sulfoaluminate cement on the basis of aluminum-containing residual materials.

DE 196 44 654 A1 describes the production of a calcium sulfoaluminate cement from treated salt slags.

FR 2 928 643 describes the production and composition of a belite-calcium sulfoaluminate (ferrite) clinker from a mixture comprising minerals which contain calcium, aluminum, silicon, iron and sulfur, preferably in the form of sulfate. The raw meal mixture is sintered by being passed through a kiln with a pass-through is time of at least 15 minutes.

FR 2 946 978 describes the production and composition of a belite-calcium sulfoaluminate (ferrite) clinker from a mixture of different raw materials.

EP 1 171 398 B1 (DE 600 29 779 T2) describes the sintering of specific raw materials at 900 to 1200° C. so as to produce special clinkers in the kiln which have high concentrations of crystal X={(C, K, N, M)$_4$(A, F, Mn, P, T, S)$_3$(Cl, \$)} and crystal Y={(C$_2$S)$_3$(CS)$_3$Ca(f,cl)$_2$} and/or crystal Z={C$_5$S$_2$\$}. These clinkers are mixed with hydraulic cement or cement of the Portland type to produce finished cement compositions.

It was the object of the invention to provide an improved calcium sulfoaluminate (ferrite) clinker, calcium sulfoaluminate (ferrite) cement and calcium sulfoaluminate (ferrite) binder, which have a lesser negative impact on the environment, since industrial byproducts can constitute a large portion of the raw meal mixture and/or the production thereof releases less $CO_2$.

Surprisingly, it was found that the $C_5S_2\$$ phase (ternesite, also referred to as sulfospurrite or sulfate spurrite) constitutes a significantly reactive component in sulfoaluminate cements. The literature (see, for example, "Synthesis of Calcium Sulfoaluminate Cements From Al$_2$O$_3$-Rich By-products from Aluminium Manufacture", Milena Marroccoli et al., The second international conference on sustainable construction materials and technologies 2010, "Synthesis of Special Cements from Mixtures Containing Fluidized Bed Combustion Waste, Calcium Carbonate and Various Sources of Alumina", Belz et al, 28th Meeting of the Italian Section of The Combustion Institute 2005, "Fluidized Bed Combustion Waste as a Raw Mix Component for the Manufacture of Calcium Sulphoaluminate Cements", Belz G et al, 29th Meeting of the Italian Section of The Combustion Institute, 2006 and "The Fabrication of Value Added Cement Products from Circulating Fluidized Bed is Combustion Ash", Jewell R. B et al, World of Coal Ash (WOCA) Covington, Ky., USA, 2007) describes the $C_5S_2\$$ phase as being less reactive or inert and as undesirable. In addition, methods for avoiding this "undesirable phase" are highlighted on a regular basis. It was surprising to find during our experiments that a significant amount of this $C_5S_2\$$ phase reacts already within the first few days of hydration and significantly influences the phase composition of the hydrated samples.

The above object is thus solved by a ternesite calcium sulfoaluminate clinker, cement and binder made therefrom. It is further solved by the addition of ternesite to calcium sulfoaluminate cement, in which the ternesite clinker is obtained by sintering a raw meal mixture containing at least sources for CaO, SiO$_2$ and SO$_3$, wherein the sintering temperature is set such that the ternesite clinker contains at least 20% by weight of $C_5S_2\$$, based on the total weight of the clinker. The ternesite clinker is mixed with a calcium sulfoaluminate clinker or cement or with a calcium sulfoaluminate belite clinker or cement to form a binder, either before or after grinding.

Within the scope of the present invention, clinker refers to a sintered product that is obtained by burning a raw material mixture at a high temperature and contains at least one hydraulically reactive phase. The term cement refers to a clinker that is ground with or without the addition of further components. A binder or a binder mixture refers to a hydraulically hardening mixture containing cement and, typically but not necessarily, further finely ground components, and which is used after the addition of water and, optionally, admixtures and mineral aggregate.

A clinker can already contain all the phases that are necessary and desired and, after grinding to form a cement, can be used directly as a binder. According to the invention, the composition of the binder is obtained by mixing two or more clinkers and/or cements, wherein the mixing takes place before (or during) grinding and/or in the ground state and/or during production of the binder. Unless a point in time is for the mixing is stated explicitly, the following descriptions relate to binders (and cements) that are not limited in this regard.

Unless indicated otherwise, "reactive" refers to hydraulic reactivity.

Phases, such as $C_5S_2\$$, for example, are presented primarily stoichiometrically, although the exact composition can deviate/vary. Furthermore, various foreign ions from the group of halogens, nonmetals, alkaline and alkaline earth metals, as well as representatives of the transition metals and semimetals and metals can be incorporated into the crystal structure of the phase. These are all suitable for the clinker according to the invention. Phosphate, fluoride, nitrate or chloride, for example, are preferably incorporated into the structure of $C_5S_2\$$ for the stabilization thereof (for example at high temperatures >1200° C.). Phosphate and/or iron may preferably be incorporated into the $C_4A_3\$$ phase. The incorporation of foreign ions can result in an elevated formation speed of the phase in the hot zone, which, in turn, potentially reduces the residence time required and/or can result in the quantitative increase thereof. As is the case for the designation $C_4(A_xF_{(1-x)})_3\$$ for the clinker phase, the designation $Al_2O_3(Fe_2O_3)$ means that aluminum can be substituted in part by iron, that is to say x is a number from 0.1 to 1.0. Aluminum is typically present with small admixtures of iron, although the use of large quantities of iron up to a predominant content of iron falls within the scope of the invention.

Substances which are effective as fluxes and/or decrease the temperature that is necessary for melt formation and/or such that improve clinker formation e.g. by solid solution formation and/or phase stabilization are designated mineralizers.

Evidence of the incorporation of iron is the quantitative decrease of iron-rich phases (for example Fe$_3$O$_4$, C$_2$F and C$_4$AF), the increase of the phase $C_4A_3\$$ or $C_4(A_xFe_{(1-x)})_3\$$, and the increase in the peak intensities and lattice parameter c (Å) [crystal system: orthorhombic] from 9.1610 [PDF number: 01-085-2210, is Tetracalcium hexaaluminate sulfate (VI)-Ca$_4$ (Al$_6$O$_{12}$)(SO$_4$), ICSD collection code: 080361, calculated from ICSD using POWD-12++, (1997), structure: Calos, N. J., Kennard, C. H. L., Whittaker, A. K., Davis, R. L., J. Solid State Chem., 119, 1, (1995)] over 9.1784 [PDF number: 00-051-0162, Calcium Aluminum Iron Oxide Sulfate—Ca$_4$((Al$_{0.95}$Fe$_{0.05}$))$_6$O$_{12}$(SO$_4$), ICSD collection code:—, primary reference: Schmidt, R., Pöllmann, H., Martin-Luther-Univ., Halle, Germany., ICDD Grant-in-Aid, (1999)] up to values over 9.2000. A potential solid solution formation can also be determined by determining the occupation factors in a Rietveld refinement by under-occupations or mixed occupations of individual atomic layers. The color change of the clinkers, which can be distinct, is another purely qualitative indicator. For example, the color of the clinkers changes from a chestnut brown/ocher to greenish brown to a light shade of gray.

$C_5S_2\$$ can be produced by sintering raw materials that supply sufficient amounts of CaO, SiO$_2$ and SO$_3$. Pure or substantially pure raw materials, such as calcium carbonate or calcium oxide, quartz powder or microsilica, and calcium sulfate, are suitable for this purpose. On the other hand, a variety of natural as well as industrial materials, which include, for example, but are not limited to, limestone, bauxite, clay/claystone, calcined clay (for example metakaolin), basalts, peridotites, dunites, ignimbrites, carbonatites, ashes/slags/granulated blast furnace slags of high and low quality (mineralogy/glass content, reactivity, and the like), various waste dump materials, red and brown muds, natural sulfate carriers, desulfurization slags, phosphogypsum, gypsum from flue gas desulfurization, titanogypsum, fluorogypsum, and the like, can be used in suitable combinations as the raw material. In addition, substances/substance groups that have not been specifically listed are covered by the scope of protection if they satisfy the minimum chemical requirements as potential raw materials. The raw materials may be pretreated, but do not have to be.

Ternesite also occurs as a mineral, although there are no known deposits from is which it can be obtained in sufficient quantities or purity, and so the use of "natural" ternesite is indeed possible but is actually uneconomical. Production by sintering suitable raw materials is preferable according to the invention.

In one embodiment the ternesite calcium sulfoaluminate clinker is produced by a specific method from raw materials, which at least sources for CaO, $AC_2O_3(\pm Fe_2O_3)$, $SiO_2$ and $SO_3$ by burning and subsequent tempering.

The method according to the invention for producing a hydraulically reactive clinker by sintering a raw meal mixture containing sources for CaO, $Al_2O_3(Fe_2O_3)$, $SiO_2$ and $SO_3$ firstly comprises, as a first step, a conversion or sintering of the raw meal mixture in a temperature range of >1200° C. to 1350° C., preferably of 1250 to 1300° C., over a period of time sufficient to obtain an clinker intermediate product. The period is typically 10 min to 240 min, preferably 30 min to 90 min. The clinker intermediate product is then tempered in a temperature range of 1200° C. up to a lower limit of 750° C., preferably in a temperature range of 1150 to 850° C., over a period of time sufficient to obtain the desired amount of $C_5S_2\$$ as well as to convert a specific amount of aluminate and ferrate phases and residues of the crystalline high-temperature phases of the raw materials with remaining C$ into additional $C_4(A_xF_{1-x})_3\$$, where x is from 0.1 to 1, preferably from 0.95 to 0.8, and $C_5S_2\$$. The clinker should pass through the temperature range between 1200° C. and 1050° C. for a period of 10 min to 180 min, preferably of 25 min to 120 min and more preferably of 30 min to 60 min. During the cooling process, the clinker may pass through a range of 1050° C. to 750° C., preferably of 1050° C. to 850° C., for a period of 5 min to 120 min, preferably of 10 min to 60 min. The clinker is then cooled rapidly in a manner known per se, thus preventing further phase conversions. The method is described in detail in EP 11006757.6 which herewith is incorporated by reference in this respect in its entirety.

In accordance with the invention, a clinker containing the main components $C_4(A_xF_{1-x})_3\$$, $(\alpha; \beta) C_2S$ and $C_5S_2\$$ in the following proportions is thus obtained
 $C_5S_2\$$ 5 to 75 wt %, preferably from 10 to 60 wt % and more preferably from 20 to 40 wt %
 $C_2S$ 1 to 80 wt %, preferably from 5 to 70, more preferably from 10 to 65 wt % and most preferably from 20 to 50 wt %
 $C_4(A_xF_{1-x})_3\$$ 5 to 70 wt %, preferably from 10 to 60 wt % and more preferably from 20 to 45 wt %
 secondary phases 0 to 30 wt %, preferably 5 to 25 wt % and more preferably from 10 to 20 wt %.

As secondary phases calcium silicates, sulfates, calcium aluminates, spinels, representatives of the melilite group, periclase, free lime, quartz, olivines, pyroxenes, representatives of the merwinithe group, apatites, ellestadites, silicocarnitites, spurrite and/or a glass phase can occur for example.

The free lime content of the clinker lies preferably below 5 wt %, especially preferred below 2 wt % and most preferred below 1 wt %. In a preferred embodiment the ternesite clinker contains 1 to 10 wt %, preferably 2 to 8 wt % and more preferred 3 to 5 wt % of an x ray amorphous phase/glassy phase.

Preferably, the ratios by weight of the most important phases of the clinker according to the invention ($C_4(A_xF_{1-x})_3\$$, $(\alpha; \beta)C_2S$, $C_5S_2\$$) lie in the following ranges:
 $C_4(A_xFe_{1-x})_3\$$ to $(\alpha; \beta)C_2S$=1:16-70:1, preferably 1:8-8:1 and more preferably 1:5-5:1
 $C_4(A_xF_{1-x})_3\$$ to $C_5S_2\$$=1:15-14:1, preferably 1:8-8:1 and more preferably 1:5-5:1
 $C_5S_2\$$ to $(\alpha; \beta)C_2S$=1:15-70:1, preferably 1:8-10:1 and more preferably 1:4-5:1
 $C_4(A_xF_{1-x})_3\$$ to $((\alpha; \beta)C_2S+C_5S_2\$)$=1:16-10:1, preferably 1:8-8:1 and more preferably 1:4-4:1

The ternesite calcium sulfoaluminate clinker according to the invention can be adjusted in its properties and composition through the raw meal composition, the is contents of correctives, the burning conditions and the setting during tempering/pre-cooling, so that $C_5S_2\$$ and instead of $\beta$-$C_2S$ reactive modifications of $C_2S$, like e.g. a modifications, develop increasingly. The raw meal mixture has to undergo a temperature of more than 1200° C., so that eventual undesired crystalline high temperature phases (e.g. $C_2AS$) are converted into desired phases of the target clinker and a sufficient amount of $C_4(A_xFe_{1-x})_3\$$ is formed. However, a significant disadvantage is associated therewith. The desired phase $C_5S_2\$$ is not stable from a temperature of above $\pm 1180°$ C. and dissociates into $C_2S$ and C$. Therefore, sintering at above 1200° C. is combined with a targeted cooling of the clinker over a time prolonged as compared with the usual time over a range from 1200° C. to 750° C., preferably from 1150° C. to 850° C. and more preferred from 1150° C. to 1080° C., in order to selectively form $C_5S_2\$$ besides the phase $C_4(A_xFe_{1-x})_3\$$. Surprisingly another advantage has been found for this tempering process. When the phase $C_4(A_xFe_{1-x})_3\$$ (produced at above 1200° C.) selectively undergoes a range from 1150° C. to 1050° C., it becomes measurably richer in iron and its content rises a little, due to consumption/conversion of for example $C_4AF$, $C_2F$, CF.

The contents of the main oxides of the clinker preferably comprise the following ranges:

| | |
|---|---|
| CaO | 35 to 65 wt % |
| $Al_2O_3(Fe_2O_3)$ | 7 to 45 wt % |
| $SiO_2$ | 5 to 28 wt % |
| $SO_3$ | 5 to 20 wt %. |

It is advantageous if the clinker according to the invention has a periclase content of >2 wt %. In addition, the clinker may contain one or more secondary elements and/or compounds thereof from the group of the alkaline and alkaline earth metals and/or the transition metals and/or the metals and/or the semi-metals and/or the non-metals in a proportion of up to 20 wt %, preferably of ≤15 wt % and more is preferably of ≤10 wt %.

Alternatively, a ternesite clinker with a content of $C_5S_2\$$ in the range from 20 to 100 wt % and a content of $C_4(A_xFe_{1-x})_3\$$ below 20 wt % can be produced. The separate production of ternesite or of a clinker or cement having ternesite as at least one of the main components has the advantage that ternesite or said clinker can be produced in one step in a temperature range of typically 900 to 1200° C., preferably 1050 to 1150°

C. Compared to the burning temperatures when producing clinkers containing ye'elimite as primary phase, these low burning temperatures result in the added advantage that higher contents of magnesium/periclase (>2% by weight) can be selectively set in the clinker according to the invention. Due to the low burning temperature, periclase can be present in a reactive form and can contribute to the strength development/hydration. Higher burning temperatures can also be used, however, depending on the mixture of raw materials, provided ternesite is formed in large portions, preferably 20 to 100% of the clinker.

If the objective of production is to obtain the purest $C_5S_2\$$ possible, raw materials are selected that have no components other than sources for CaO, $SiO_2$ and $SO_3$, or only a few further components. The conversion of calcium carbonate with quartz powder and calcium sulfate in the temperature range of typically 900 to 1200° C., preferably 1050 to 1150° C., yields $C_5S_2\$$ with a purity of >99%.

It is preferable, however, to use the greatest possible portion of low-cost and environmentally compatible raw materials to produce $C_5S_2\$$. "Environmentally compatible" means using the least amount of energy possible and/or thoughtful utilization of natural raw materials and high-quality waste products and byproducts.

A reaction of approximately 25% of the fly ash FA2 (see examples) with approximately 45% limestone K1, approximately 8% quartz (Merck, analytical grade) and approximately 20% MicroA (natural anhydrite) resulted in a clinker is having a $C_5S_2\$$ content of >70%, and with the reaction of ~8% metakaolin, ~58% K1, ~23% MicroA and ~10% $SiO_2$ purities of >80% were achieved.

The reaction of these raw materials is likewise preferably carried out in the temperature range of 900 to 1200° C., and preferably of 1050 to 1150° C. Contrary to the known sintering of the same raw materials with the goal of forming $C_4A_3\$$ at a minimum temperature of 1200° C., here substantially ternesite is formed. Depending on the raw material composition, higher temperatures of up to 1300° C., for example, may also be suitable, for example if relevant amounts of phosphorus are present, as is the case when using phosphogypsum. Contrary to the known methods/clinkers, however, the invention focuses on the formation of ternesite, and the sintering temperature is thus optimized for forming the same. In the prior art, however, the sintering temperature was optimized for the formation of $C_4A_3\$$, and ternesite should not be formed where possible. In contrast, according to the invention the temperature is selected such that as much ternesite as possible is formed and, insofar as the raw materials contain sources for $Al_2O_3$ or $Fe_2O_3$, the content of $C_4(A_xF_{(1-x)})_3\$$ is limited to less than 15%. While it would also be possible to use clinkers containing more $C_4(A_xF_{(1-x)})_3\$$, where x is 0.1 to 1, and preferably 0.8 to 0.95, a higher content thereof will come at the expense of ternesite, and the corresponding higher sintering temperature can also adversely affect the reactivity of ternesite.

The temperature range of 900° C. to 1300° C., and preferably of 1050° C. to 1150° C., should be maintained for a period of 10 minutes to 180 minutes, preferably 25 minutes to 120 minutes, and even more preferably 30 minutes to 60 minutes. For the purpose of forming desired further phases during cooling, the clinker can pass through the range of 900° C. to 750° C. for a period of 5 minutes to 120 minutes, and preferably 10 minutes to 60 minutes. Finally, possibly also without delayed cooling by passing through the range of 900° C. to 750° C., the is clinker is rapidly cooled down in the known manner, so that additional phase changes are prevented.

Clinkers containing ternesite as the main component without any significant amounts of ye'elimite have always been avoided until now and are thus novel and likewise the subject matter of the present invention, as is the use thereof as an additive in calcium sulfoaluminate (ferrite) cement and binders.

According to the invention, the clinker containing $C_5S_2\$$ as the main component, or a cement obtained therefrom by grinding without additives, contains the following components in the indicated proportions:

| | |
|---|---|
| $C_5S_2\$$ | 20 to 100% by weight, preferably 30 to 95% by weight, and even more preferably 40 to 90% by weight |
| $(\alpha, \beta) C_2S$ | 0 to 80% by weight, preferably 5 to 70% by weight, and even more preferably 10 to 60% by weight |
| $C_4(A_xF_{(1-x)})_3\$$ | 0 to <15% by weight, preferably 3 to 12% by weight, and even more preferably 5 to 10% by weight |
| $C_2(A_yF_{(1-y)})$ | 0 to 30% by weight, preferably 5 to 20% by weight, and even more preferably 8 to 15% by weight |
| reactive aluminates | 0 to 20% by weight, preferably 1 to 15% by weight, and even more preferably 3 to 10% by weight |
| periclase (M) | 0 to 25% by weight, preferably 1 to 15% by weight, and even more preferably 2 to 10% by weight |
| secondary phases | 0 to 30% by weight, preferably 3 to 20% by weight, and even more preferably 5 to 10% by weight, | based on the total amount of clinker/cement, wherein the proportions of the phases add up to 100%.

By adding mineralizers to the raw meal it is specifically possible that a part up to the predominant part of the dicalcium silicate is present in the form of doted "α" $C_2S$, like for example in the presence of $P_2O_5$ as calcium phosphate silicate $[Ca_2SiO_4.0.05Ca_3(PO_4)_2]$, besides stabilization of ternesite. Such compounds equally fall within the group of reactive α $C_2S$ polymorphs and the scope of the present invention.

The designation $(\alpha, \beta) C_2S$ means that this can be polymorphs of $C_2S$ and mixtures thereof, the reactive a polymorphs (for example α, $\alpha'_L$, $\alpha'_H$) being preferred. At least 5% by weight of a polymorphs of $C_2S$ are preferably present because these advantageously contribute to high early strength.

In the $C_4(A_xF_{(1-x)})_3\$$ phase, x ranges from 0.1 to 1, and preferably from 0.8 to 0.95. In the $C_2(A_yF_{(1-y)})$ phase, y ranges from 0.2 to 0.8, and preferably from 0.4 to 0.6.

Reactive aluminates shall be understood to include, for example, but not be limited to, $C_3A$, CA and $C_{12}A_7$.

Secondary phases can be in the form, for example but not exclusively, of alkaline/alkaline earth sulfates, quartzes, spinels, olivines, pyroxenes, representatives of the melilite and merwinite group, apatites, ellestadites, silicocarbitites, free lime, spurrite, quartz and/or an X-ray-amorphous phase content/a glass phase, in a proportion of 0% by weight to 30% by weight, preferably 2% by weight to 20% by weight, and particularly preferably 5% by weight to 15% by weight. The free lime content of the clinker is below 5% by weight, preferably below 2% by weight, and particularly preferably below 1% by weight.

The contents of the main oxides of a clinker that contains $C_5S_2\$$ as the primary phase and is produced separately cover the following ranges:

| | |
|---|---|
| CaO | 40 to 70% by weight, preferably 45 to 60% by weight, and even more preferably, 50 to 55% by weight |
| $SiO_2$ | 5 to 30% by weight, preferably 10 to 25% by weight, and even more preferably, 15 to 23% by weight |
| $SO_3$ | 3 to 30% by weight, preferably 5 to 26% by weight, and even more preferably, 8 to 22% by weight |
| $\Sigma(Al_2O_3 + Fe_2O_3)$ | 0 to 40% by weight, preferably 5 to 30% by weight, and even more preferably, 8 to 20% by weight |
| MgO | 0 to 25% by weight, preferably 2 to 15% by weight, and even more preferably, 5 to 10% by weight, | based on the total amount of clinker/cement, wherein the proportions of the contents add up to 100%.

The raw materials for producing the ternesite clinker according to the invention are ground to common degrees of fineness in a manner known per se. Degrees of fineness of 2000 to 10000 cm$^2$/g, preferably in the range of 3000 to 6000 cm$^2$/g and, particularly preferably, from 4000 to 5000 cm$^2$/g are particularly well suited. The grinding fineness depends primarily on the type and composition of the raw material that is used, the burning process (temperature, residence time in the sintering zone, etc.) and the desired properties of the binder and the technical possibilities that are available.

The binder according to the invention and/or the cement according to the invention comprise, as primary phases, at least $C_5S_2\$$ and $C_4(A_xF_{(1-x)})_3\$$, where x is from 0.1 to 1, preferably from 0.8 to 0.95, and preferably also $C_2(A_yF_{(1-y)})$, where y is from 0.2 to 0.8, preferably from 0.4 to 0.6, and reactive polymorphs of $C_2S$. The binder typically also contains anhydrite and may contain calcium ferrite (for example $C_2F$) and/or aluminum silicates $C_2AS$, $CAS_2$, tricalcium silicate and free lime. The binder preferably also contains admixtures and/or additives, and optionally further hydraulically active components. The additives can be latent hydraulic, pozzolanic and/or not hydraulically active (for example ground limestone/dolomite, precipitated $CaCO_3$, $Mg(OH)_2$, $Ca(OH)_2$, aluminum hydroxides [for example amorphous $Al(OH)_3$], soluble alkali aluminates [for example $Na_2Al_2O_4$], silica fume) components.

Cement and binders can be obtained by admixing ternesite to calcium sulfoaluminate (ferrite) (belite) clinker, calcium sulfoaluminate (ferrite) (belite) cement or calcium sulfoaluminate (ferrite) (belite) cement binder.

The binder according to the invention is obtained by combining a calcium sulfoaluminate (ferrite) (belite) (CSA(F)(B)) clinker or calcium sulfoaluminate (ferrite) (belite) cement with a content of the reactive phase $C_4(A_xF_{1-x})_3\$$ of 10 to 80% by weight (where x is from 1 to 0.1) with a clinker and/or cement containing 20 to 100% by weight of $C_5S_2\$$ to form a cement/binder. The at least two components are present with the following proportions:

| | |
|---|---|
| clinker or cement containing CSA(F)(B) | 10 to 90% by weight, preferably 20 to 70% by weight, and even more preferably 30 to 60% by weight |
| clinker or cement containing $C_5S_2\$$ | 10 to 90% by weight, preferably 30 to 80% by weight, and even more preferably 40 to 70% by weight. |

The proportions are based on the total amount of binder, wherein the proportions add up to 100%.

The clinker with the primary phase $C_5S_2\$$ can be used as an independent binder with a suitable composition, such as, for example but not exclusively, by increased contents of reactive aluminates and ferrates. However, it is more advantageous to combine it with CSA(F)(B) clinkers and cements to form binders of optimized composition.

The ternesite calcium sulfoaluminate clinker or the ternesite clinker, respectively, is ground in a manner known per se with of without sulfate carrier to usual cement fineness (according to Blaine) from 2000 to 10000 cm$^2$/g, preferably 3000 to 6000 cm$^2$/g and most preferred 4000 to 5000 cm$^2$/g in order to produce cement or binder mixtures, respectively.

The ground ternesite calcium sulfoaluminate clinker or ternesite clinker, respectively, can be combined with one or with mixtures of further substances, like for example, but not exclusively, Portland cement, geopolymer binders, calcium aluminate cement, synthetic or natural pozzolans/latent hydraulic materials, lime stone powder, etc., or several thereof, to form a binder mixture. Contrary to EP 1 171 398 B1 this is not necessary to achieve a useful hydraulic reactivity, rather the clinker ground to cement shows the desired hydraulic reactivity on its own.

The cement or the binder mixture preferably also contains one or more setting and/or hardening accelerators as an admixture, which are preferably selected among components having available aluminum, or such which in contact with water liberate aluminum, for example in the form of $Al(OH)_4^-$ or amorphous $Al(OH)_3$ gel, which include, for example, but are not limited to, soluble alkali aluminates [for example $Na_2Al_2O_4$, $K_2Al_2O_4$, and the like], and amorphous aluminum hydroxide (for example $Al(OH)_3$). Moreover, the cement or the binder mixture may contain one or more setting and/or hardening accelerators as an admixture, likewise in combination with the aforementioned components having available aluminum, preferably selected from lithium salts and hydroxides, other alkali salts and hydroxides, and alkali silicates.

Additives, such as alkali aluminates and alkali salts, silicates and hydroxides, for example, which additionally increase the pH value of the solution and consequently the reactivity of $C_5S_2\$$, are particularly preferred and can be metered in an amount ranging from 0.1 to 10% by weight, preferably from 0.5 to 5% by weight, and even more preferably from 1 to 2% by weight.

It is furthermore preferable for the following to be contained: concrete plasticizers and/or plasticizing admixtures and/or retarders, preferably on the basis of ligninosulfonates, sulfonated naphthalene condensate, melamine condensate or phenolformaldehyde condensate, or on the basis of acrylic acid-acrylamide mixtures or polycarboxylate ethers or on the basis of phosphated polycondensates, phosphated alkylcarbonic acid and salts thereof, (hydroxy)-carboxylic acids and carboxylates, borax, boric acid and borates, oxalates, sulfanilic acid, amino carboxylic acids, salicylic acid and acetylsalicylic acid, dialdehydes.

A conventional calcium sulfoaluminate (ferrite) (belite) clinker or cement can be ground together with a clinker and/or cement containing primarily $C_5S_2\$$ from 20 to 100% by weight as well as other sulfate carriers, or it can be ground separately, and subsequently combined to form a cement/binder.

It has surprisingly been found that synthetic and natural (tempered) pozzolanes (including, for example, but not limited to, brick dust, fly ashes, tuff, trass, sediments having a high content of soluble silica, tempered clays and shale, synthetic glasses, and the like), latent hydraulic materials (such as, for example, but not limited to, ground granulated blast furnace slag, synthetic glasses, and the like) and combinations thereof can be added to the binder in relatively high contents (such materials are hereinafter collectively referred to as cementitious materials [CM]). By contrast, the use of such materials is typically only possible to a very limited extent (according to the literature 15% by weight at most

[Živica V. (2000) Properties of blended sulfoaluminate belite cement. C. B. Mat., vol. 14, p. 433-437; Živica V. (2001) Possibility of the modification of the properties of sulfoaluminate belite cement by its blending. Ceramics Silikaty, vol. 45 (1), p. 24-30]) with binders based on CSA(F)(B) due to the low pH value and/or the low or absent portlandite content. By adding a ternesite-based clinker or cement to calcium sulfoaluminate (ferrite) (belite) clinker/cement/binder, the proportions of such additions and/or mixtures may be as follows:

| | |
|---|---|
| binder | 20 to 95% by weight, preferably 40 to 80% by weight, and even more preferably 50 to 70% by weight |
| CM | 5 to 80% by weight, preferably 20 to 60% by weight, and even more preferably 30 to 50% by weight, | wherein the values are based on the total amount of binder, and the proportions, together with the remaining binder components, add up to 100%.

It is particularly preferred if synthetic and natural pozzolanes and latent hydraulic materials are added, which make a contribution of their own to the development of strength with the ternesite. Surprisingly, it was found that in the case of aluminum-rich pozzolanes/latent hydraulic materials, the aluminum thereof, which is liberated during hydration (for example in the form of $Al(OH)_4^-$ or as amorphous aluminum hydroxide (gel)), is reacted with ternesite. It is particularly advantageous that ternesite is able to continuously supply sulfate, so that $Al(OH)_4^-$ or amorphous aluminum hydroxide available at a later time, for example formed due to the reaction of ground granulated blast furnace slag and/or fly ash, can also be reacted. Sulfate attacks are prevented at least to a large extent, and generally completely.

In the presence of water, the binder according to the invention forms $AF_t$ and $AF_m$ phases and $Al(OH)_3$ due to the reaction with, for example, $C_4A_3\$$. The formation/liberation of $Al(OH)_4^-$ or as amorphous aluminum hydroxide (gel) results in the progressive reaction of the $C_5S_2\$$ phase and, on the one hand, supplies additional sulfate, which in turn stabilizes $AF_t$ and prevents/reduces a possible transformation into $AF_m$, and on the other hand a reactive form of $C_2S$ is liberated, $C_5S_2\$$ or $(C_2S)_2 \cdot C\$ \leftrightarrow 2\ C_2S + 1\ C\$$, which can react with water, but also with the available $Al(OH)_3$ and can form $C_2AS \cdot 8\ H_2O$ (stratlingite) as well as C-(A)-S-H. The stabilization of $AF_t$ and the consumption of $Al(OH)_3$ as well as the decrease in porosity due to the formation of $C_2AS \cdot 8\ H_2O$ and C-(A)-S-H of the cement according to the invention result in a considerable improvement in the durability, for example, without being limited to this, due to the decrease in the overall porosity and/or the associated pore space and the resistance to a possible sulfate attack.

Preferred pozzolanes/latent hydraulic materials include tempered clays (for example metakaolin) and shale, fly ashes, ground granulated blast furnace slags as well as synthetic (pozzolanic and latent hydraulic) glasses.

The components of the binder according to the invention can be ground separately or together, and with or without additional sulfate carriers, in the known manner to customary degrees of cement fineness (according to Blaine) between 2000 and 10000 $cm^2/g$, preferably between 3000 and 6000 $cm^2/g$, and even more preferably between 4000 and 5000 $cm^2/g$. Alkali and/or alkaline earth sulfates are particularly suitable sulfate carriers, preferably in the form of gypsum and/or hemihydrate and/or anhydrite and/or magnesium sulfate.

The clinker containing $C_5S_2\$$, particularly if the clinker contains few other phases, can be ground with very low energy expenditure, so that it can be adjusted to greater degrees of fineness of the $C_5S_2\$$-containing clinker by separate grinding or pre-grinding, for example if higher reactivity (faster reaction/consumption) of $C_5S_2\$$ is desired. If this is required for a special application, the ground product can have a particle size distribution of $d_{50}$ less than 20 μm and $d_{90}$ less than 100 μm, or $d_{50}$ less than 5 μm and $d_{90}$ less than 20 μm, or $d_{50}$ less than 0.1 μm and $d_{90}$ less than 2 μm.

An intensive grinding of the clinker containing $C_5S_2\$$ can result in a phase content of the clinker, e.g. $C_5S_2\$$, being x ray amorphous partly (often 3 to 20%) up to almost totally (>90%). This is always accompanied by a significant increase in reactivity and allows the formulation of novel highly reactive binder systems.

A very finely ground ternesite clinker can add to strength already within the first 24 h to 7 days. Such a grinding is not possible for a clinker containing significant amounts (e.g. 15% or more) of $C_4A_3\$$, since $C_4A_3\$$ is easier to grind than $C_5S_2\$$ and would be ground too fine, therefore. The high reactivity of $C_4A_3\$$ and its high water demand would prevent obtaining a useful binder when $C_5S_2\$$ is ground such finely in a ternesite-calcium sulfoaluminate clinker.

During processing of the cement according to the invention, or of a binder containing the same, a water/binder value of 0.2 to 2 is suitable, preferably of 0.3 to 0.8, and more preferably of 0.45 to 0.72.

Individual components or component mixtures can be used to produce the binder, depending on the quality and composition of the available raw materials or clinkers.

Calcium sulfoaluminate clinkers and cements having the main component $C_4A_3\$$ are known and available in different compositions. These are all suitable for the binder according to the invention. For example, the following calcium sulfoaluminate cements are commercially available:

| Lafarge Aether®: | | | |
|---|---|---|---|
| belite (α; +/−β) $C_2S$ | 40-75%; | ye'elimite $C_4A_3\$$ | 15-35%; |
| ferrite $C_2(A,F)$ | 5-25%; | secondary phases | 0.1-10% |
| Lafarge Rockfast®: | | | |
| belite (α; +/−β) $C_2S$ | 0-10%; | ye'elimite $C_4A3\$$ | 50-65% |
| aluminate CA | 10-25%; | gehlenite $C_2AS$ | 10-25%; |
| ferrite $C_2(A,F)$ | 0-10%; | secondary phases | 0-10% |
| Italcementi Alipre®: | | | |
| belite (α; +/−β) $C_2S$ | 10-25%; | ye'elimite $C_4A_3\$$ | 50-65%; |
| anhydrite $C\$$ | 0-25%; | secondary phases | 1-20% |
| Cemex CSA: | | | |
| belite (α; +/−β) $C_2S$ | 10-30%; | ye'elimite $C_4A3\$$ | 20-40% |
| anhydrite $C\$$ | >1%; | alite $C_3S$ | >1-30%; |
| free lime CaO | <0.5-6%; | portlandite $Ca(OH)_2$ | 0-7%; |
| secondary phases | 0-10% | | |
| Denka® CSA | | | |
| belite (α; +/−β) $C_2S$ | 0-10%; | ye'elimite $C_4A3\$$ | 15-25%; |
| anhydrite $C_2(A,F)$ | 30-40%; | portlandite $Ca(OH)_2$ | 20-35%; |
| free lime CaO | 1-10%; | secondary phases | 0-10% |
| China Type II & III CSA | | | |
| belite (α; +/−β) $C_2S$ | 10-25%; | ye'elimite $C_4A3\$$ | 60-70%; |
| ferrite $C_2(A,F)$ | 1-15%; | secondary phases | 1-15% |
| Barnstone CSA | | | |
| belite (α; +/−β) $C_2S$ | 22%; | ye'elimite $C_4A3\$$ | 60%; |
| aluminate $C_{12}A_7$ | 5%; | alite $C_3S$ | 8%; |
| ferrite C2(A,F) | 4%; | secondary phases | 1% |

The calcium sulfoaluminate clinkers and cements already contain ternesite in part, but normally the amount is too low. $C_5S_2\$$ or a mixture rich therein is therefore added. It additionally appears that $C_5S_2\$$ produced selectively, that is to say at optimal temperature, in accordance with the invention is more reactive than a ternesite obtained with the production of CSA(B) as a byproduct (see examples 4 and 5).

With reference to the belite content, again, not all calcium sulfoaluminate clinkers meet the requirements of the binder according to the invention, and therefore belite or belite-rich mixtures are also added if the belite content of the calcium sulfoaluminate component and/or ternesite component is too low. Belite may contribute to early strength, but may also contribute substantially significantly to the final strength of the possible binder systems and may also contribute to activation of pozzolanic and latent hydraulic materials.

The cement or binder according to the invention is excellently suited for solidifying hazardous waste. A content of adsorptively effective additives, such as zeolites and/or ion-exchange resins, is preferred. A high pH value, which promotes the formation of poorly soluble hydroxides, can be advantageous for immobilizing heavy metals in inorganic binders. This can be implemented, for example but not exclusively, by mixing the clinker according to the invention with Portland cement in a binder.

A further advantage of the cement according to the invention and of the binder mixture produced therefrom is the formation of different phases during hydration (for example ettringite [$AF_t$], monophases [$AF_m$], metal-metal hydroxy salts [LDH], etc.), which incorporate in their structure various heavy metals as well as other harmful substances (for example chlorides, etc.) and can thus permanently fix them.

The invention will be explained on the basis of the following examples, although it is not limited to the specific embodiments described. Unless indicated otherwise or unless the context automatically stipulates to the contrary, the percentages are based on weight; if in doubt then on the total weight of the mixture.

The invention also relates to all combinations of preferred embodiments, provided they are not mutually exclusive. When used in conjunction with a numerical value, the expressions "around" or "approximately" mean that at least values that are higher or lower by 10% or values that are higher or lower by 5% and, in any case, values that are higher or lower by 1%, are included.

BRIEF DESCRIPTION OF THE DRAWINGS

FIG. 1a and 1b show the specific and cumulative heat flow of cement pastes CSA-C$ and CSA-T.

FIGS. 2a and 2b show the specific and cumulative heat flow of cement pastes CSA-C$ and CSA-T.

FIGS. 3a and 3b show the specific and cumulative heat flow of cement pastes CSA-C$ and CSA-TK$_{13}$ FA-C$.

FIGS. 4a and 4b show the specific and cumulative heat flow of cement pastes CSA-C$ and CSA-TK$_{13}$ AGS-C$.

FIGS. 5a and 5b show the specific and cumulative heat flow of cement pastes M1 and M1a.

FIGS. 6a and 6b show the specific and cumulative heat flow of cement paste M2.

FIGS. 7a and 7b show the specific and cumulative heat flow of cement pastes L1, L1a and L1b.

FIGS. 8a and 8b show the specific and cumulative heat flow of cement pastes L2 and L2a.

FIGS. 9a and 9b show the specific and cumulative heat flow of cement pastes L3 and L3a.

FIG. 10 shows the dependence of the lattice parameters on synthesis temperature and on the specific cooling program and on $SO_3$ content.

FIG. 11 shows the specific heat flow of cement pastes from example 10.

EXAMPLES

In table 2, the raw materials used and with which the examples described hereinafter were carried out are characterized on the basis of the oxidic main components and degree of fineness thereof. The loss of weight after tempering at 1050° C. is also indicated. Table 3 shows the mineralogical phase composition of the industrial byproducts used.

TABLE 2

| Elemental composition of the raw materials used (RFA) | | | | | | | | | | | |
|---|---|---|---|---|---|---|---|---|---|---|---|
| Raw Material | | Limestone | Slags | | | Fly ashes | | | Sulfate Carrier | Al corr. | Metakaolin |
| Sample RFA | Unit | K1 | S1 | S2 | S3 | FA1 | FA2 | FA3 | MicroA | Al(OH)$_3$ | MK |
| GV 1050° C. | % | 43.09 | 0.00 | 0.00 | 1.15 | 3.48 | 0.82 | 2.79 | 4.64 | 34.64 | 1.91 |
| $SiO_2$ | % | 1.53 | 36.82 | 43.42 | 35.46 | 35.70 | 28.50 | 47.30 | 4.17 | 0.00 | 48.00 |
| $Al_2O_3$ | % | 0.35 | 11.72 | 11.40 | 12.99 | 21.8 | 12.50 | 27.70 | 1.36 | 65.36 | 41.60 |
| $TiO_2$ | % | 0.03 | 0.88 | 0.64 | 0.70 | 1.21 | 1.05 | 1.38 | 0.04 | 0.00 | |
| MnO | % | 0.01 | 0.37 | 1.05 | 0.62 | 0.03 | 0.18 | 0.06 | 0.00 | 0.00 | |
| $Fe_2O_3$ | % | 0.19 | 0.52 | 1.43 | 0.26 | 6.22 | 5.18 | 6.29 | 0.37 | 0.00 | 1.80 |
| CaO | % | 54.50 | 38.61 | 37.36 | 37.81 | 25.80 | 37.40 | 7.84 | 37.40 | 0.00 | 5.70 |
| MgO | % | 0.22 | 7.75 | 2.62 | 774 | 1.34 | 4.81 | 2.31 | 1.82 | 0.00 | 0.10 |
| $K_2O$ | % | 0.04 | 0.44 | 0.36 | 0.74 | 0.13 | 0.28 | 1.46 | 0.28 | 0.00 | 0.95 |
| $Na_2O$ | % | 0.00 | 0.18 | 0.38 | 0.75 | 0.07 | 0.07 | 0.59 | 0.06 | 0.00 | |
| $SO_3$ | % | 0.01 | 2.70 | 1.11 | 1.58 | 3.96 | 7.71 | 0.29 | 49.80 | 0.00 | |
| $P_2O_5$ | % | 0.01 | 0.00 | 0.01 | 0.00 | 0.15 | 1.27 | 1.77 | 0 | 0.00 | |
| Total | | 99.98 | 100.00 | 99.78 | 99.80 | 99.89 | 99.77 | 99.78 | 99.94 | 100.00 | 100.06 |
| Amorphous | % | / | / | >95 | | 48.0 | 38.0 | 58.9 | / | / | >95 |
| Density | g/cm$^3$ | 2.64 | 2.82 | 2.82 | 2.81 | 2.59 | 2.82 | 2.30 | | | 2.54 |
| Grinding fineness acc. to Blaine | cm$^2$/g | 3350 | 4700 | 3710 | 3900 | 6380 | 4380 | 4270 | | | |

TABLE 3

Mineralogical phase composition of the fly ash FA1 used (QXRD according to Rietveld)

| Raw Material | | Slags | | | Ashes | | |
|---|---|---|---|---|---|---|---|
| Sample Mineral | Unit | S1 | S2 | S3 | FA1 | FA2 | FA3 |
| Calcite | wt % | | | 1.2 | 1.6 | | |
| Quartz | wt % | 0.5 | 0.25 | | 7.5 | 11.5 | 9.8 |
| Cristobalite | wt % | | | | 1.2 | 0.4 | |
| Free lime | wt % | | | | 2.4 | 9.3 | 0.9 |
| Periclase | wt % | | | | | 2.8 | 1.1 |
| Anhydrite | wt % | | | | 4.5 | 10.4 | 0.6 |
| Feldspar | wt % | | | | 8.0 | | |
| Akermanite | wt % | 56.0 | | 18.3 | | | |
| Gehlenite | wt % | 26.8 | | 8.9 | 8.9 | 6.3 | |
| Merwinite | wt % | | 0.4 | 3.1 | | 4.9 | |
| Augite | wt % | 14.6 | | | | | |
| Mullite | wt % | 0.8 | | | 3.6 | | 25.1 |
| Maghemite | wt % | | 0.14 | | 1.8 | 1.2 | 1.4 |
| Hematite | wt % | | | | 2.4 | 0.9 | 0.8 |
| Rutile | wt % | | | | | | 0.3 |
| Perovskite | wt % | | | | 2.4 | | |
| Ye'elimite | wt % | | | | 1.2 | 3.1 | |
| $C_2S$ | wt % | | | | 6.5 | 8.1 | 1.1 |
| $C_4AF$ | wt % | | | | | 3.1 | |
| $C_5S_2\$$ | wt % | 1.3 | | | | | |
| Amorphous | wt % | 0.00 | 99.21 | 68.5 | 48.0 | 38.0 | 58.9 |

Example 1

$T_{pur}$

A stoichiometric mixture of $CaCO_3$ [Merck, analytical grade], $CaSO_4$ [Merck, analytical grade] and quartz powder [Merck, analytical grade] was burned for 1 h at 1100° C., subsequently cooled rapidly, ground and burned once more for 1 h at 1100° C. and cooled rapidly.

Example 2

$TK_{FA}$

The raw mixture consisted of 45% by weight of limestone (K1)+27% by weight of $FA_2$, 20% by weight of MicroA and 8% by weight of quartz powder (Merck, analytical grade). The raw meal was sintered at 1100° C. and, after sintering, was subjected to a cooling program for tempering in which the temperature was lowered from 1100° C. to 850° C. over a period of approximately 35 minutes. The clinker was then cooled rapidly on exposure to air.

Example 3

$TK_{AGS}$

The raw mixture consisted of 58% by weight of K1+8% by weight of MK, 24% by weight of MircoA and 10% by weight of quartz powder (Merck, analytical grade). The raw meal was subjected to the same program as in example 2.

Example 4

Different binders were mixed from a commercial CSA cement (see table 6 for composition) and the three ternesite qualities from examples 1 to 3 as well as Micro A. The compositions of the ternesites are listed in table 4 and the mixing ratios with the cement are listed in table 5; FIGS. 1 to 4 show the heat flow and the cumulative heat flow of the mixtures when mixed with water with a w/b value of 0.7.

Table 7 gives the mineralogy of the cements corresponding to Example 4 (QXRD according to Rietveld) and TG data (chemically bonded water) of the cements as well as the hardened cement pastes produced therefrom, standardized to 100% paste; w/c value 0.7.

TABLE 4

Chemical (calculated) and mineralogical composition of the clinkers from examples 1 to 3

| | $T_{pur}$ | $TK_{FA}$ | $TK_{AGS}$ |
|---|---|---|---|
| Oxides | | | |
| $SiO_2$ | 25.00% | 21.30% | 22.16% |
| $Al_2O_3$ | — | 4.75% | 4.94% |
| $TiO_2$ | — | 0.38% | 0.04% |
| MnO | — | 0.07% | 0.01% |
| $Fe_2O_3$ | — | 1.96% | 0.45% |
| CaO | 58.34% | 53.20% | 55.34% |
| MgO | — | 2.23% | 0.77% |
| $K_2O$ | — | 0.19% | 0.22% |
| $Na_2O$ | — | 0.04% | 0.02% |
| $SO_3$ | 16.66% | 15.44% | 16.06% |
| $P_2O_5$ | — | 0.44% | 0.01% |
| Phases | | | |
| Anhydrite | 0.4 | 0.3 | 0.2 |
| $C_3A$ (cub) | — | 2.2 | — |
| $C_3A$ (orth) | — | 1.2 | 0.4 |
| $C_2S$ a'H | — | 2.7 | 1.4 |
| $C_2S$ beta | — | 5.7 | 3.2 |
| $C_2S$ gamma | — | 1.1 | 0.4 |
| $\Sigma C_2S$ | — | 9.5 | 5.0 |
| Ternesite | 99.2 | 74.9 | 85.5 |
| Free lime | <0.1 | 0.3 | 0.3 |
| Periclase | — | 1.2 | 0.5 |
| $C_4A_3S$ | — | 9.3 | 7.0 |
| Augite | — | 1.2 | 1.1 |
| Quartz | 0.4 | — | — |
| Ratios | | | |
| $CaO/Al_2O_3$ | — | 11.21 | 11.21 |
| $Al_2O_3/Fe_2O_3$ | — | 2.42 | 10.92 |
| $SO_3/(Al_2O_3 + Fe_2O_3)$ | — | 2.30 | 2.98 |
| $SO_3/SiO_2$ | 0.67 | 0.72 | 0.72 |
| $CaO/SO_3$ | 3.50 | 3.45 | 3.45 |
| $CaO/SiO_2$ | 2.33 | 2.50 | 2.50 |
| $MgO/SiO_2$ | 0.00 | 0.10 | 0.03 |

TABLE 5

Mixtures of a commercial calcium sulfoaluminate cement with clinkers corresponding to examples 1-3

| Mixture | CSA | $T_{pur}$ | $TK_{FA}$ | $TK_{AGS}$ | Micro A |
|---|---|---|---|---|---|
| CSA-C$ | 85% | | | | 15% |
| CSA-T | 60% | 40% | | | |
| CSA-T-C$ | 68% | 20% | | | 12% |
| CSA-TK_FA-C$ | 68% | | 20% | | 12% |
| CSA-TK_AGS-C$ | 68% | | | 20% | 12% |

TABLE 6

Chemical composition of the used commercial calcium sulfoaluminate cement

| | | China CSA |
|---|---|---|
| GV 1050° C. | % | 0.18 |
| $SiO_2$ | % | 6.93 |
| $Al_2O_3$ | % | 36.48 |

TABLE 6-continued

Chemical composition of the used commercial calcium sulfoaluminate cement

| | | China CSA |
|---|---|---|
| $TiO_2$ | % | 1.64 |
| MnO | % | 0.00 |
| $Fe_2O_3$ | % | 2.24 |
| CaO | % | 40.61 |
| MgO | % | 2.94 |
| $K_2O$ | % | 0.18 |
| $Na_2O$ | % | 0.00 |
| $SO_3$ | % | 8.61 |
| $P_2O_5$ | % | 0.14 |
| Total | % | 99.94 |

TABLE 7

Mineralogy of the cements and hardened cement pastes of example 4

| | 0 Days | 7 Days |
|---|---|---|
| CSA-C$ | | |
| Ye'elimite | 33.8% | 0.8% |
| Anhydrite | 8.8% | 2.0% |
| Belite (total) | 8.1% | 8.0% |
| $C_3A$ cub | 1.3% | 1.0% |
| $C_4AF$ | 1.3% | 0.5% |
| Ettringite | 0.0% | 29.7% |
| Stratlingite | 0.0% | 2.2% |
| Traces | 5.6% | 7.0% |
| Amorphous | 0.0% | 41.6% |
| Water | 41.2% | 7.1% |
| CSA-T-C$ | | |
| Ye'elimite | 27.0% | 0.8% |
| Anhydrite | 7.1% | 1.8% |
| Belite (total) | 6.4% | 6.4% |
| $C_3A$ cub | 1.0% | 0.9% |
| $C_4AF$ | 1.0% | 0.5% |
| Ternesite ($C_5S_2$$) | 11.8% | 10.1% |
| Ettringite | 0.0% | 25.8% |
| Stratlingite | 0.0% | 2.1% |
| Traces | 4.5% | 6.4% |
| Amorphous | 0.0% | 35.0% |
| Water | 41.2% | 10.2% |
| CSA-TK_AGS-C$ | | |
| Ye'elimite | 27.8% | 0.4% |
| Anhydrite | 7.1% | 1.5% |
| Belite (total) | 7.0% | 7.2% |
| $C_3A$ cub | 1.0% | 0.8% |
| $C_4AF$ | 1.0% | 0.4% |
| Ternesite ($C_5S_2$$) | 10.1% | 8.1% |
| Ettringite | 0.0% | 23.5% |
| Stratlingite | 0.0% | 2.2% |
| Traces | 4.7% | 5.3% |
| Amorphous | 0.0% | 39.5% |
| Water | 41.2% | 11.2% |
| CSA-T | | |
| Ye'elimite | 23.8% | 0.0% |
| Belite (total) | 5.7% | 5.6% |
| $C_3A$ cub | 0.9% | 0.4% |
| $C_4AF$ | 0.9% | 0.6% |
| Ternesite ($C_5S_2$$) | 23.5% | 20.3% |
| Ettringite | 0.0% | 10.8% |
| Stratlingite | 0.0% | 2.4% |
| Traces | 4.0% | 10.4% |
| Amorphous | 0.0% | 33.7% |
| Water | 41.2% | 15.8% |
| CSA-TK_FA-C$ | | |
| Ye'elimite | 28.1% | 0.4% |
| Anhydrite | 7.1% | 1.0% |
| Belite (total) | 7.6% | 7.7% |
| $C_3A$ cub | 1.4% | 1.3% |
| $C_4AF$ | 1.0% | 0.8% |
| Ternesite ($C_5S_2$$) | 8.8% | 5.5% |
| Ettringite | 0.0% | 25.1% |
| Stratlingite | 0.0% | 2.4% |
| Traces | 4.8% | 6.5% |
| Amorphous | 0.0% | 39.1% |
| Water | 41.2% | 10.3% |

Example 5

The raw mixture consisted of 44% by weight of K1+25% by weight of FA1+sulfate carrier and Al(OH)$_3$. One sample (M1) was cooled directly after sintering, the second sample (M1a) was subjected to a cooling program for tempering in which the temperature was lowered from 1200° C. to 850° C. over a period of approximately 45 minutes after sintering and the clinker was then cooled rapidly on exposure to air.

Example 6

The raw mixture consisted of 65% by weight of (80% K1/20% MK)+5% by weight of FA3+sulfate carrier and Al(OH)$_3$. The sample (M2) was subjected to the same cooling program as M1a after sintering and was then cooled.

Example 7

The raw mixture consisted of 45% by weight of K1+35% by weight of S2+sulfate carrier and Al(OH)$_3$. One sample (L1) was cooled directly after sintering, the second sample (L1a) was subjected to the same cooling program as M1a after sintering and was then cooled. the third sample (L1b) was subjected to a cooling program for tempering in which the temperature was lowered from 1150° C. to 1100° C. over a period of approximately 60 minutes after sintering and the clinker was then cooled rapidly on exposure to air.

Example 8

The raw mixture consisted of 37% by weight of K1+54% by weight of FA2+sulfate carrier and Al(OH)$_3$. One sample (L2) was cooled directly after sintering, the second sample (L2a) was subjected to the same cooling program as M1a after sintering and was then cooled.

Example 9

The raw mixture consisted of 41% by weight of K1+41% by weight of S1+sulfate carrier and Al(OH)$_3$. One sample (L3) was cooled directly after sintering, the second sample (L3a) was subjected to the same cooling program as M1a after sintering and was then cooled.

The results of the analysis of the clinkers and hardened cement pastes, which were made from a mixture of 85% by weight of the clinker and 15% by weight anhydrate with a water/cement value of 0.7, are summarized in table 8. In FIGS. 5 to 9 the heat flow measurements are shown.

Example 10

The raw mixture consisted of 52.2% by weight of $CaCO_3$ (Merck, analytical grade)+32.6% by weight of FA2+Micro A and Al(OH)$_3$. Two samples (CSAB1250_a and b) were directly cooled rapidly on exposure to air after sintering at 1250° C., two further samples (CSAB1100_a and b) were, after tempering at 1250° C., cooled to 1100° C. in the oven and kept for 1 h at that temperature, subsequently directly cooled rapidly on exposure to air. For two further samples (CSAB1100-SO3_a and b) the sulfate content in the raw meal was increased, subsequently these samples were subjected to the same temering and cooling program as CSAB1100_a and b.

Table 9 lists the lattice parameters and compositions determined for the obtained clinkers. FIG. 10 illustrates the dependency of the lattice parameters from synthesis temperature or the specific cooling program, respectively, as well as the $SO_3$-content.

By optimizing the $SO_3/(Al_2O_3+Fe_2O_3)$ ratio as well as using a specific method of manufacturing the clinker composition can be optimized or varied, respectively, (see table 9).

The increasing amount of iron integration in the structure of ye'elimite corresponds to the growth of the lattice parameter. Also a cubic modification occurs increasingly with the iron integration instead of the orthorombic one.

FIG. 11 shows the heat flow of hardened cement pastes from mixtures of 90% of the clinker with 10% MircoA and the pure clinkers CSAB1100-SO3_b at a w/c of 0.6. Clinker, made according to the two step process of the invention or with an optimized minerological composition of the raw meal react/hydrate clearly at earlier points in time. Experiments proved that this is accompanied by a significant increase of early strength.

TABLE 8

QXRD data (according to Rietveld) of the clinkers as well as the hardened cement pastes made therefrom

| | Clinker | | | Cement Stone | | | | | | |
|---|---|---|---|---|---|---|---|---|---|---|
| | | | | physical bound | chemical | | | | | |
| Sample | $C_2S$ [wt.-%] | $C_4(A_XF_{(1-X)})_3$$ [wt.-%] | $C_5S_2$$ [wt.-%] | water (40° C.) [wt.-%] | bound water [wt.-%] | $C_2S$ [wt.-%] | $C_4(A_XF_{(1-X)})_3$$ [wt.-%] | $C_5S_2$$ [wt.-%] | AFt [wt.-%] | $C_2ASH_8$ [wt.-%] | amorphous [wt.-%] |
| M1 | 45 | 39 | 1 | 14 | 30.8 | 20 | — | — | 35 | 2 | 39 |
| M1a | 42 | 42 | 5 | 12.8 | 31.8 | 14 | — | — | 26 | 5 | 51 |
| M2 | 23 | 44 | 26 | 18.6 | 25.8 | 30 | — | 12 | 22 | — | 32 |
| L1 | 59 | 21 | 2 | 24 | 21.4 | 34 | — | — | 27 | — | 24 |
| L1a | 58 | 22 | 2 | 23.4 | 22.6 | 34 | — | — | 31 | — | 24 |
| L1b | 46 | 22 | 19 | 23.6 | 22.1 | 27 | — | 7 | 29 | — | 26 |
| L2 | 30 | 23 | 31 | 25.9 | 18.8 | 24 | — | 17 | 29 | — | 19 |
| L2a | 20 | 24 | 42 | 26.2 | 19.2 | 15 | — | 26 | 28 | — | 19 |
| L3 | 63 | 22 | 1 | 24.6 | 19.6 | 46 | — | 1 | 30 | — | 6 |
| L3a | 55 | 23 | 12 | 24.9 | 190 | 40 | — | 4 | 29 | — | 11 |

TABLE 9

QXRD data (according to Rietveld) of the clinkers according to example 10

| | in clinker [wt.-%] | | | | | |
|---|---|---|---|---|---|---|
| Phases | CSAB1250_a | CSAB1250_b | CSAB1100_a | CSAB1100_b | CSAB1100-SO3_a | CSAB1100-SO3_b |
| $C_4A_3$$ ortho | 12.8 | 12.6 | 10.3 | 10.5 | 9.2 | 2.4 |
| $C_4A_3$$ cub | 13.8 | 13.8 | 15.7 | 16.5 | 20.1 | 21.4 |
| $\Sigma C_4A_3$$ | 26.5 | 26.4 | 26.0 | 27.0 | 29.3 | 23.8 |
| $\alpha$-$C_2S$ | 0.8 | 1.0 | 1.6 | 2.1 | 1.9 | 1.3 |
| $\beta$-$C_2S$ | 54.2 | 51.5 | 50.2 | 50.6 | 53.2 | 15.8 |
| $\gamma$-$C_2S$ | 3.8 | 5.8 | 5.1 | 5.0 | 0.0 | 0.0 |
| $\Sigma C_2S$ | 58.8 | 58.2 | 56.8 | 57.6 | 55.2 | 17.1 |
| $C_5S_2$$ | 0.0 | 0.0 | 0.8 | 0.8 | 5.2 | 49.7 |
| $C_4AF$ | 7.2 | 6.7 | 6.7 | 6.6 | 2.7 | 1.3 |
| Minors | 7.5 | 8.7 | 9.6 | 8.0 | 7.7 | 8.3 |
| Sum | 100.0 | 100.0 | 100.0 | 100.0 | 100.0 | 100.0 |
| $SO_3/(Al_2O_3 + Fe_2O_3)$ | 0.25 | 0.25 | 0.25 | 0.25 | 0.40 | 0.91 |
| $\alpha$ $C_4A_3$$ cub | 9.198 | 9.199 | 9.199 | 9.200 | 9.205 | 9.207 |
| c $C_4A_3$$ otho | 9.149 | 9.150 | 9.150 | 9.150 | 9.174 | 9.182 |

The invention claimed is:

1. A ternesite calcium sulfoaluminate clinker or cement obtained by sintering a raw meal mixture, which contains sources for CaO, $Al_2O_3(Fe_2O_3)$, $SiO_2$, and $SO_3$,
   wherein the raw meal mixture is sintered in a temperature range of >1200° C. to 1350° C. over a period of time sufficient to convert the raw meal mixture into a clinker intermediate product,
   wherein the clinker intermediate product is tempered in a temperature range of 1200° C. to a lower limit of 750° C. over a period of time sufficient to obtain 5-75 wt % of $C_5S_2\$$ and to convert an amount of aluminate and ferrate phases and residues of crystalline high-temperature phases of the raw meal mixture with remaining C$ into additional $C_4(A_xF_{1-x})_3\$$ and $C_5S_2\$$, and
   wherein the clinker comprises main components comprising $C_4(A_xF_{1-x})_3\$$, (α; β) $C_2S$, $C_5S_2\$$ in the following proportions

| | |
|---|---|
| $C_5S_2\$$ | 5 to 75 wt % |
| $C_2S$ | 1 to 80 wt % |
| $C_4(A_xF_{1-x})_3\$$ | 5 to 70 wt % |
| secondary phases | 0 to 30 wt %, | wherein x is a number from 0.1 to 1, and wherein the clinker is cooled.

2. A binder containing a ground ternesite calcium sulfoaluminate clinker or cement according to claim 1.

3. The binder according to claim 2, wherein latent hydraulic materials and/or pozzolans are contained in a range of 5 to 80% by weight.

4. The binder according to claim 3, wherein latent hydraulic materials and/or pozzolans are contained in a range of 20 to 60% by weight.

5. The binder according to claim 3, wherein the latent hydraulic materials and/or pozzolans are selected from the group consisting of tempered clays, shale, fly ashes, ground granulated blast furnace slags, synthetic pozzolanic glasses, and synthetic latent hydraulic glasses.

6. The binder according to claim 2, wherein the binder additionally contains further hydraulically reactive materials and/or not hydraulically reactive materials in a range from 1 to 30% by weight.

7. The binder according to claim 6, wherein the further hydraulically reactive material is Portland cement.

8. The binder according to claim 6, wherein the not hydraulically reactive material is selected from the group consisting ground limestone, ground dolomite, precipitated $CaCO_3$, $Ca(OH)_2$, $Mg(OH)_2$, silica fume, and mixtures thereof.

9. The binder according to claim 7, wherein the not hydraulically reactive material is selected from the group consisting of ground limestone/dolomite, precipitated $CaCO_3$, $Ca(OH)_2$, $Mg(OH)_2$, silica fume, and mixtures thereof.

10. The binder according to claim 7, wherein the binder contains a component having available aluminum, which in contact with water liberates aluminum, as a setting and/or hardening accelerator being an admixture, in an amount in the range of 0.1 to 15% by weight.

11. The binder according to claim 2, wherein the binder contains lithium salts and lithium hydroxides and/or other alkali salts, other alkali hydroxides, and alkali silicates as additives.

12. The binder according to claim 11, wherein the binder contains alkali salts, alkali silicates, and alkali hydroxides, which increase a pH value of a solution of the binder and therefore also reactivity of $C_5S_2\$$.

13. The binder according to claim 2, wherein the binder contains one or more setting and/or hardening accelerators as an admixture in an amount in the range of 0.1 to 15% by weight.

14. The binder according to claim 13, wherein the admixture is a component having available aluminum, which in contact with water liberates aluminum.

15. The binder according to claim 14, wherein the component having available aluminum is selected from the group consisting of soluble alkali aluminates, amorphous aluminum hydroxide, calcium aluminate cement, and geopolymer binder.

16. A method for producing a concrete or mortar, comprising:
   providing a binder according to claim 2, and
   combining the binder with mineral aggregates and with water, wherein a water/binder value of 0.2 to 2 is set.

17. A method for immobilizing pollutants or providing a sealing wall mass, comprising:
   providing a binder according to claim 2, and
   adding zeolites and/or ion-exchange resins.

18. The binder according to claim 2, wherein the clinker intermediate product is tempered in a temperature range of 1200° C. to a lower limit of 750° C. over a period of time sufficient to obtain at least 10 wt % of $C_5S_2\$$.

19. The binder according to claim 3, wherein the clinker intermediate product is tempered in a temperature range of 1200° C. to a lower limit of 750° C. over a period of time sufficient to obtain at least 10 wt % of $C_5S_2\$$.

20. The binder according to claim 2, wherein the clinker intermediate product is tempered in a temperature range of 1200° C. to a lower limit of 750° C. over a period of time sufficient to obtain at least 20 wt % of $C_5S_2\$$.

21. The binder according to claim 3, wherein the clinker intermediate product is tempered in a temperature range of 1200° C. to a lower limit of 750° C. over a period of time sufficient to obtain at least 20 wt % of $C_5S_2\$$.

22. A ternesite clinker or cement, obtained by sintering a raw meal mixture, which contains at least sources for CaO, $SiO_2$ and $SO_3$, wherein temperature during sintering is set in a range of 900 to 1300° C. such that the ternesite clinker has a content of $C_5S_2\$$ in the range of 20 to 95% by weight and a content of $C_4(A_xF_{1-x})_3\$$ below 15% by weight, in each case based on the total weight of the clinker, containing 20 to 95% by weight of the clinker phase $C_5S_2\$$ and the further clinker phases (α; β) $C_2S$, $C_4(A_xF_{(1-x)})_3\$$, where x is from 0.1 to 1.0, $C_2(A_yF_{(1-y)})$, where y is from 0.2 to 0.8, reactive aluminates, periclase (M), and secondary phases in the following proportions:

| | |
|---|---|
| (α, β) $C_2S$ | 0 to 80% by weight |
| $C_4(A_xF_{(1-x)})_3\$$ | 0 to <15% by weight |
| $C_2(A_yF_{(1-y)})$ | 0 to 30% by weight |
| reactive aluminates | 0 to 20% by weight |
| periclase (M) | 0 to 25% by weight |
| secondary phases | 0 to 30% by weight, | wherein the proportions of the clinker phases add up to 100%.

23. A binder containing a ground ternesite clinker or cement according to claim 22 and a ground calcium sulfoaluminate clinker.

24. A binder according to claim 23, wherein the binder contains the calcium sulfoaluminate clinker in an amount in the range of 10 to 90% by weight and the ternesite clinker in an amount in the range of 10 to 90% by weight, wherein all components of the binder add up to 100%.

25. The binder according to claim 24, wherein the binder contains the calcium sulfoaluminate clinker in an amount in the range of 20 to 70% by weight and the ternesite clinker in an amount in the range of 30 to 80% by weight.

26. The binder according to claim 25, wherein latent hydraulic materials and/or pozzolans are contained in a range of 20 to 60% by weight.

27. The binder according to claim 23, wherein latent hydraulic materials and/or pozzolans are contained in a range of 5 to 80% by weight.

28. The binder according to claim 27, wherein latent hydraulic materials and/or pozzolans are contained in a range of 20 to 60% by weight.

29. The binder according to claim 27, wherein the latent hydraulic materials and/or pozzolans are selected from the group consisting of tempered clays, shale, fly ashes, ground granulated blast furnace slags, synthetic pozzolanic glasses, and synthetic latent hydraulic glasses.

30. The binder according to claim 23, wherein the binder additionally contains further hydraulically reactive materials and/or not hydraulically reactive materials in a range from 1 to 30% by weight.

31. The binder according to claim 30, wherein the not hydraulically reactive material is selected from the group consisting of ground limestone, ground dolomite, precipitated $CaCO_3$, $Ca(OH)_2$, $Mg(OH)_2$, silica fume, and mixtures thereof 32. The binder according to claim 30, wherein the further hydraulically reactive material is Portland cement.

33. The binder according to claim 32, wherein the not hydraulically reactive material is selected from the group consisting of ground limestone/dolomite, precipitated $CaCO_3$, $Ca(OH)_2$, $Mg(OH)_2$, silica fume, and mixtures thereof.

34. The binder according to claim 30, wherein the binder contains a component having available aluminum, which in contact with water liberates aluminum, as a setting and/or hardening accelerator being an admixture, in an amount in the range of 0.1 to 15% by weight.

35. The binder according to claim 23, wherein the binder contains lithium salts and lithium hydroxides and/or other alkali salts, other alkali hydroxides, and alkali silicates as additives.

36. The binder according to claim 35, wherein the binder contains alkali salts, alkali silicates and alkali hydroxides, which increase a pH value of a solution of binder and therefore also the reactivity of $C_5S_2\$$.

37. The binder according to claim 23, wherein the binder contains one or more setting and/or hardening accelerators as an admixture in an amount in the range of 0.1 to 15% by weight.

38. The binder according to claim 37, wherein the admixture is a component having available aluminum, which in contact with water liberates aluminum.

39. The binder according to claim 38, wherein the component having available aluminum is selected from the group consisting of soluble alkali aluminates, amorphous aluminum hydroxide, calcium aluminate cement, and geopolymer binder.

40. The binder according to claim 23, wherein the ternesite clinker and the calcium sulfoaluminate clinker are ground together or separately to degrees of fineness (according to Blaine) in the range of 2000 to 10000 $cm^2/g$, either with or without sulfate carriers in the form of alkaline and/or alkaline earth sulfates.

41. The binder according to claim 40, wherein the degree of fineness ranges from 3000 to 6000 $cm^2/g$.

42. The binder according to claim 23, wherein the ternesite clinker is ground to degrees of fineness (according to Blaine) in the range of 2000 to 10000 $cm^2/g$, either with or without sulfate carriers in the form of alkaline and/or alkaline earth sulfates.

43. The binder according to claim 42, wherein the degree of fineness ranges from 3000 to 6000 $cm^2/g$.

44. The binder according to claim 42, wherein the ternesite cement has a particle size distribution with a $d_{50}$ of less than 20 μm and $d_{90}$ less than 100μm.

45. The binder according to claim 44, wherein the particle size distribution has a $d_{50}$ of less than 5 μm and a $d_{90}$ of less than 20 μm.

46. A method for producing a concrete or mortar, comprising:
   providing a binder according to claim 23, and
   combining the binder with mineral aggregates and with water, wherein a water/binder value of 0.2 to 2 is set.

47. A method for immobilizing pollutants or providing a sealing wall mass, comprising:
   providing a binder according to claim 23, and
   adding zeolites and/or ion-exchange resins.

\* \* \* \* \*